US012326905B2

(12) United States Patent
Nagae et al.

(10) Patent No.: US 12,326,905 B2
(45) Date of Patent: Jun. 10, 2025

(54) SENTENCE SEARCH APPARATUS, SENTENCE SEARCH METHOD, AND STORAGE MEDIUM

(71) Applicants: KABUSHIKI KAISHA TOSHIBA, Tokyo (JP); Toshiba Digital Solutions Corporation, Kawasaki (JP)

(72) Inventors: Hisayoshi Nagae, Yokohama Kanagawa (JP); Kenji Iwata, Tokyo (JP); Takami Yoshida, Kamakura Kanagawa (JP); Yuka Kobayashi, Seto Aichi (JP); Tsuyoshi Kushima, Kawasaki Kanagawa (JP); Urara Iwata, Saitama Saitama (JP); Yukiko Furusawa, Shiki Saitama (JP)

(73) Assignees: KABUSHIKI KAISHA TOSHIBA, Tokyo (JP); Toshiba Digital Solutions Corporation, Kanagawa (JP)

( * ) Notice: Subject to any disclaimer, the term of this patent is extended or adjusted under 35 U.S.C. 154(b) by 3 days.

(21) Appl. No.: 18/173,017

(22) Filed: Feb. 22, 2023

(65) Prior Publication Data

US 2023/0376538 A1   Nov. 23, 2023

(30) Foreign Application Priority Data

May 19, 2022 (JP) .................................. 2022-082465

(51) Int. Cl.
*G06F 16/903* (2019.01)
*G06F 16/2457* (2019.01)
*G06F 16/906* (2019.01)

(52) U.S. Cl.
CPC .. *G06F 16/90344* (2019.01); *G06F 16/24578* (2019.01); *G06F 16/906* (2019.01)

(58) Field of Classification Search
CPC ............. G06F 16/90344; G06F 16/906; G06F 16/24578
See application file for complete search history.

(56) References Cited

U.S. PATENT DOCUMENTS

| 11,151,148 B2 | 10/2021 | Tanaka et al. |
| 11,282,521 B2 | 3/2022 | Yoshida et al. |
| 2008/0162476 A1 * | 7/2008 | Watanabe ............... G06F 16/93 707/E17.096 |

(Continued)

FOREIGN PATENT DOCUMENTS

| JP | 2020123131 A | 8/2020 |
| JP | 7112155 B1 | 7/2022 |

(Continued)

*Primary Examiner* — Jensen Hu
(74) *Attorney, Agent, or Firm* — Holtz, Holtz & Volek PC

(57) ABSTRACT

A sentence search apparatus includes a processing circuit. The processing circuit: accept a character string input by a user; search a sentence collection in which a plurality of sentences as a search target is accumulated based on the accepted character string to acquire one or more search result sentences matching the accepted character string; perform sentence analysis on the search result sentence to acquire a dependency relation between words constituting the search result sentence; and determine one or more recommended words for narrowing down the search result sentence to a sentence desired by the user based on the accepted character string, the search result sentence, and the dependency relation.

10 Claims, 18 Drawing Sheets

(56) References Cited

U.S. PATENT DOCUMENTS

| | | | | |
|---|---|---|---|---|
| 2010/0063797 A1* | 3/2010 | Cong | ................... | G06F 16/367 |
| | | | | 704/9 |
| 2019/0340172 A1* | 11/2019 | McElvain | .............. | G06F 16/248 |
| 2020/0074342 A1* | 3/2020 | Karasawa | ................ | G06N 3/08 |
| 2020/0134033 A1* | 4/2020 | Takeuchi | ................. | G06N 5/02 |
| 2020/0242144 A1 | 7/2020 | Yoshida et al. | | |
| 2020/0356604 A1* | 11/2020 | Macdougall | ........... | G06N 20/00 |
| 2021/0056128 A1* | 2/2021 | O'Dwyer | ............... | G06N 5/022 |
| 2022/0035849 A1 | 2/2022 | Kawakami et al. | | |
| 2022/0327162 A1* | 10/2022 | Eto | .................. | G06F 16/90335 |

FOREIGN PATENT DOCUMENTS

| | | |
|---|---|---|
| JP | 7112156 B1 | 7/2022 |
| JP | 2022132691 A | 9/2022 |
| JP | 7172187 B2 | 11/2022 |
| JP | 7172571 B2 | 11/2022 |
| JP | 7180767 B2 | 11/2022 |

* cited by examiner

| ID | Question sentence | Answer sentence |
|---|---|---|
| 1 | When is the deadline to request for a patent proposal? | The deadline to request for a patent proposal is ⋯ |
| 2 | I want to add a co-applicant | On the patent proposal request screen, |
| 3 | I cannot log in to request site because of login error | First, ⋯ |
| ⋯ | ⋯ | ⋯ |

F I G. 3

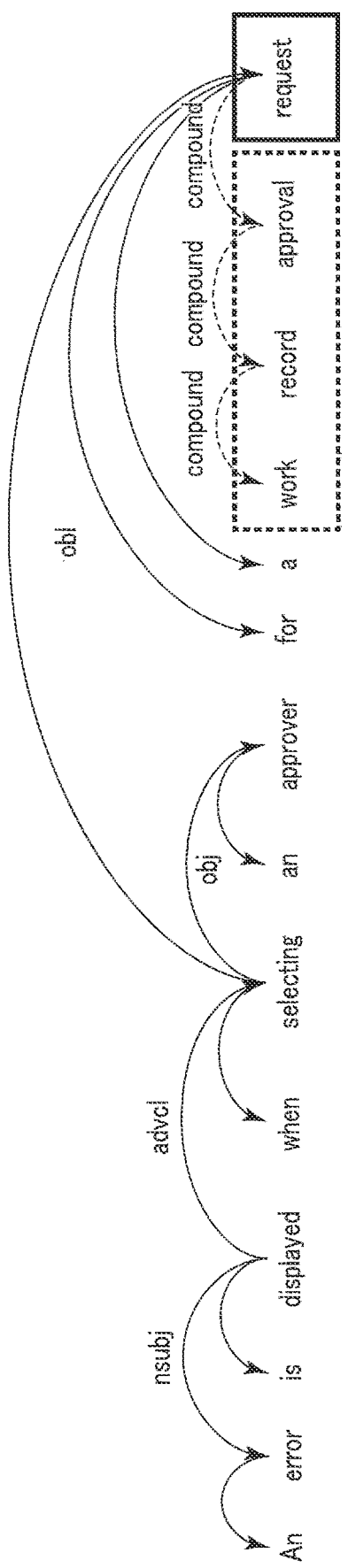
F I G. 8

Search result sentences (question sentences)

1. An error is displayed when selecting an approver for a work record approval request.
2. I want to cancel my work record approval request because I want to change my work hours.
3. Approver modifies file attached to patent proposal request.
4. When is the deadline to request for a patent proposal?
5. I received an error when selecting an approver for my visit request.
6. I want to change the participants of the visit request.
7. I cannot log in to request site because of login error.

Subject/object of base word in dependency relation

| Word | Counts | Score |
|---|---|---|
| error | 2 | 0.155 |
| cancel work record approval | 1 | 0.121 |
| approver | 1 | 0.121 |
| file attached patent proposal request | 1 | 0.121 |
| deadline request patent proposal | 1 | 0.121 |
| selecting approver visit request | 1 | 0.121 |
| participants visit request | 1 | 0.121 |
| log in request site | 1 | 0.121 |

Adverbial modifier clause of base word in dependency relation

| Word | Counts | Score |
|---|---|---|
| change work hours | 1 | 0.121 |
| selecting approver visit request | 1 | 0.121 |

Search result sentences (question sentences)

1. An error is displayed when selecting an approver for a work record approval request.
2. I want to cancel my work record approval request because I want to change my work hours.
3. Approver modifies file attached to patent proposal request.
4. When is the deadline to request for a patent proposal?
5. I received an error when selecting an approver for my visit request.
6. I want to change the participants of the visit request.
7. I cannot log in to request site because of login error.

F I G. 15

| ID | Question sentence | Answer sentence | Category |
|---|---|---|---|
| 1 | When is the deadline to request for a patent proposal? | The deadline to request for a patent proposal is ... | Patent proposal |
| ... | ... | ... | ... |
| 11 | I want to change my work hours | On the work hour management screen, ... | Work approval |
| 12 | I want to add a visitor | First, ... | Visit |
| ... | ... | ... | ... |

F I G. 16

SENTENCE SEARCH APPARATUS, SENTENCE SEARCH METHOD, AND STORAGE MEDIUM

CROSS-REFERENCE TO RELATED APPLICATION

This application is based upon and claims the benefit of priority from Japanese Patent Application No. 2022-082465, filed May 19, 2022, the entire contents of which are incorporated herein by reference.

FIELD

Embodiments described herein relate generally to a sentence search apparatus, a sentence search method, and a storage medium.

BACKGROUND

There is an interactive sentence search system that searches a collection of questions and answers in response to an inquiry from a user and selects a combination of a question and an answer matching the inquiry. In this system, if there are two or more pairs of question and answer as search results, a recommended word is provided to narrow down the search results. The recommended word is determined based on the degree of appearance of each word included in the search results. Therefore, the recommended word is not necessarily effective for narrowing down the search results in some cases.

BRIEF DESCRIPTION OF THE DRAWINGS

FIG. 3 is a diagram illustrating an example of a data structure of a collection of questions and answers according to a first embodiment.

FIG. 8 is a diagram illustrating an analysis result of a search result question sentence "an error is displayed when selecting an approver for a work record approval request".

FIG. 9 is a diagram illustrating a sentence analysis process and a recommended word determination process according to a second example.

FIG. 11 is a diagram illustrating another sentence analysis process and another recommended word determination process according to a third example.

FIG. 15 is a diagram illustrating another operation example according to the third embodiment.

FIG. 16 is a diagram illustrating an example of a data structure of a collection of questions and answers according to a fourth embodiment.

DETAILED DESCRIPTION

A sentence search apparatus according to an embodiment includes an acceptance unit, a search unit, an analysis unit, and a determination unit. The acceptance unit accepts a character string input by the user. The search unit searches a sentence collection in which a plurality of sentences to be searched is accumulated, based on the accepted character string, and acquires one or more search result sentences matching the accepted character string. The analysis unit performs sentence analysis on the search result sentence to acquire a dependency relation between words constituting the search result sentence. The determination unit determines one or more recommended words to narrow down the search result sentences to a sentence desired by the user, based on the accepted character string, the search result sentences, and the dependency relation.

Hereinafter, a sentence search apparatus, a sentence search method, and a program according to the present embodiment will be described with reference to the drawings.

First Embodiment

Figure 1:
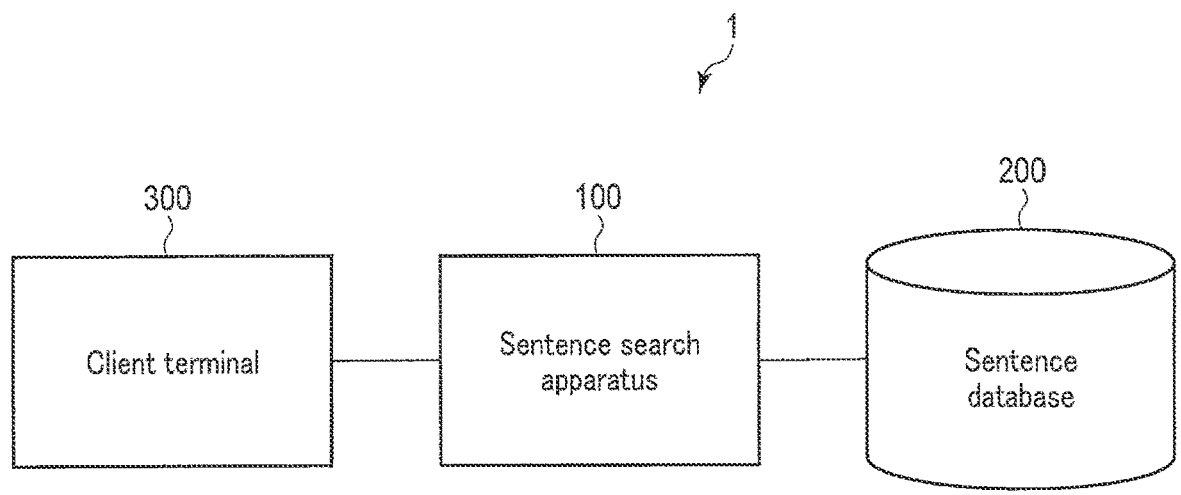
FIG. 1 is a diagram illustrating a configuration example of a sentence search system.

FIG. 1 is a diagram illustrating a configuration example of a sentence search system 1 according to a first embodiment. The sentence search system 1 is a computer network system that searches a collection of sentences in response to an inquiry from a user and executes interactive sentence search to select a sentence matching the inquiry. As illustrated in FIG. 1, the sentence search system 1 includes a sentence search apparatus 100, a sentence database 200, and a client terminal 300.

The sentence database 200 is a computer that holds a database related to a sentence collection in which a plurality of sentences to be searched are accumulated. The format of the sentence according to the present embodiment is not particularly limited, and may be a combination of two types of sentences including a question and an answer, may be a single sentence, or may be any other sentence.

The client terminal 300 is a computer used by the user of the sentence search system 1. The client terminal 300 includes a processor, an input device, a display device, and a communication device as hardware, and functions as a user interface of the sentence search system 1. For example, the client terminal 300 accepts a character string related to an inquiry input by the user via the input device. The character string related to the inquiry may be input as a natural sentence or may be input as a word. The word may be input as one word or may be input as a word string including a plurality of words. The character string related to the inquiry is transmitted to the sentence search apparatus 100. The client terminal 300 receives the search results and the like from the sentence search apparatus 100 and displays the search results and the like on the display device.

Figure 2:
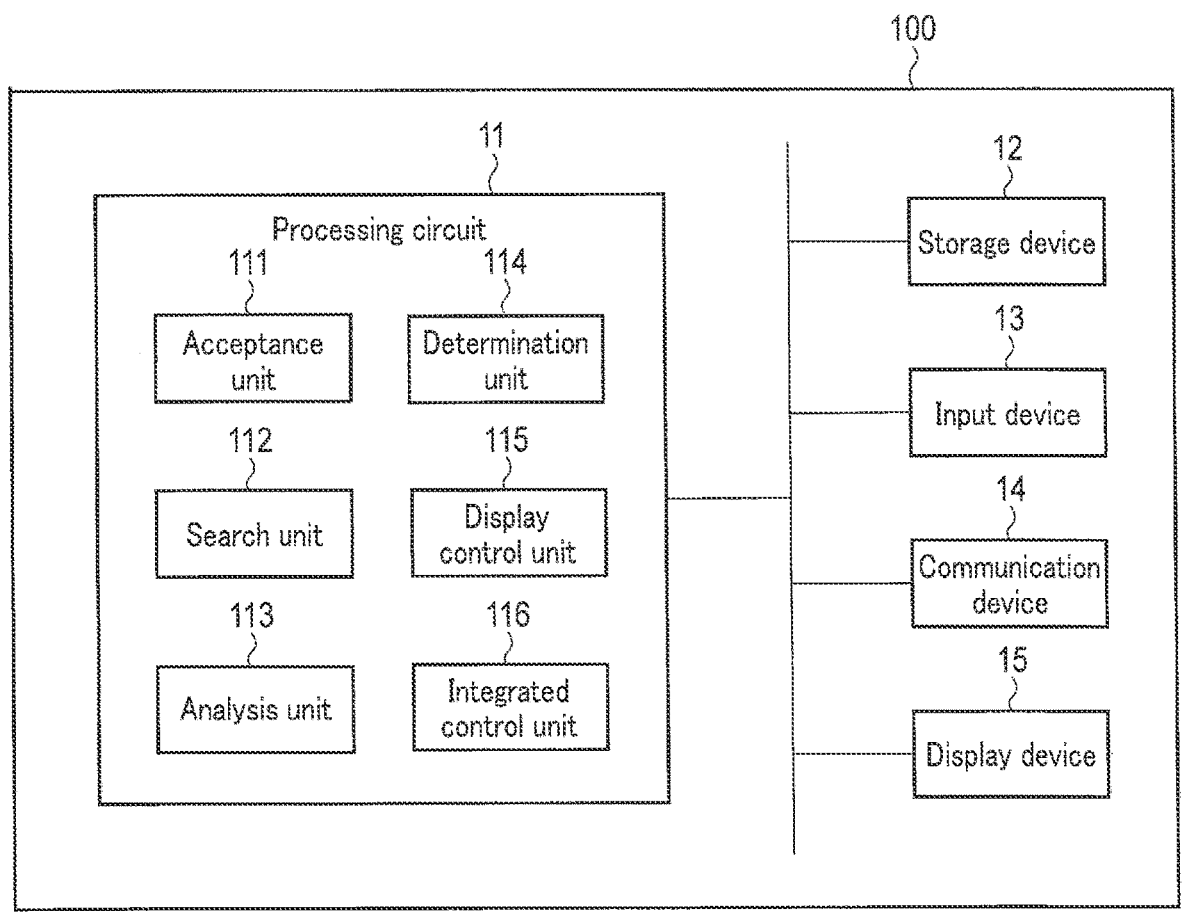
FIG. 2 is a diagram illustrating a configuration example of a sentence search apparatus.

FIG. 2 is a diagram illustrating a configuration example of the sentence search apparatus 100 included in the sentence search system 1. As illustrated in FIG. 2, the sentence search apparatus 100 is a computer including a processing circuit 11, a storage device 12, an input device 13, a communication device 14, and a display device 15. Data communication among the processing circuit 11, the storage device 12, the input device 13, the communication device 14, and the display device 15 is performed via a bus. The sentence search apparatus 100 functions as a server apparatus of the sentence search system 1. Specifically, the sentence search apparatus 100 accepts the character string related to the inquiry from the user through the client terminal 300, searches the collection of sentences stored in the sentence database 200 based on the character string related to the accepted inquiry, and displays the search results on the client terminal 300.

The processing circuit 11 includes a processor such as a central processing unit (CPU) and a memory such as a random access memory (RAM). The processing circuit 11 includes an acceptance unit 111, a search unit 112, an analysis unit 113, a determination unit 114, a display control unit 115, and an integrated control unit 116. The processing circuit 11 performs the respective functions of the units 111 to 116 by executing a sentence search program. The sentence search program is stored in a non-transitory computer-readable storage medium such as the storage device 12. The sentence search program may be implemented as a single program that describes all the functions of the unit 111 to 116 described above, or may be implemented as a plurality of modules divided into several functional units. Each of the units 111 to 116 may be implemented by an integrated circuit such as an application specific integrated circuit (ASIC). In this case, the units 111 to 116 may be mounted on a single integrated circuit, or may be individually mounted on a plurality of integrated circuits.

The acceptance unit 111 accepts a character string related to the inquiry from the user. Specifically, the acceptance unit 111 acquires the character string related to an inquiry input via the client terminal 300. Hereinafter, the character string related to the inquiry will be referred to as inquiry sentence.

The search unit 112 searches a sentence collection in which a plurality of sentences to be searched are accumulated based on the character string accepted by the acceptance unit 111, and acquires one or more sentences that conform to the accepted character string. Hereinafter, the sentence acquired as the search result will be referred to as search result sentence.

The analysis unit 113 performs sentence analysis on the search result sentence acquired by the search unit 112 to acquire a dependency relation between words constituting the search result sentence. The analysis unit 113 uses dependency parsing, syntax parsing, and/or graph-based ranking as sentence analysis.

Based on the character string accepted by the acceptance unit 111, the search result sentence acquired by the search unit 112, and the dependency relation acquired by the analysis unit 113, the determination unit 114 determines one or more recommended words for narrowing down the search result sentences to a sentence desired by the user. The determination unit 114 determines, as the recommended word, any one of a word in a modification relation with a word included in the inquiry sentence among the words constituting the search result sentence, a subject or an object of the base word among the words constituting the search result sentence, and a word in an adverbial modifier clause of the base word among the words constituting the search result sentence. In the tree structure of a sentence, the base word is a word located at a root node at the top without a parent node (nodal, vertex) and is a word that serves as a starting point of links (arrows) representing all dependency relations included in the sentence.

The display control unit 115 displays various types of information on the display device 15 or the display device of the client terminal 300. As an example, the display control unit 115 displays the search result sentence acquired by the search unit 112 and the recommended word determined by the determination unit 114.

The integrated control unit 116 integrally controls the sentence search process performed by the processing circuit 11 according to a sentence search program. For example, the integrated control unit 116 operates the acceptance unit 111, the search unit 112, the analysis unit 113, the determination unit 114, and the display control unit 115 according to the processing procedure according to the sentence search program.

The storage device 12 includes a read only memory (ROM), a hard disk drive (HDD), a solid state drive (SSD), an integrated circuit storage device, and the like. The storage device 12 stores the sentence search program and the like.

The input device 13 inputs various commands from an operator. As the input device 13, a keyboard, a mouse, various switches, a touch pad, a touch panel display, and the like can be used. An output signal from the input device 13 is supplied to the processing circuit 11.

The communication device 14 is an interface for performing data communication with an external device connected to the sentence search apparatus 100 via a network. As an example, the communication device 14 performs data communication with the sentence database 200 or the client terminal 300.

The display device 15 displays various types of information. As the display device 15, a cathode-ray tube (CRT) display, a liquid crystal display, an organic electro luminescence (EL) display, a light-emitting diode (LED) display, a plasma display, or any other display known in the related art can be appropriately used. The display device 15 may be a projector.

Hereinafter, the sentence search process by the sentence search apparatus 100 will be described. In the following description, it is assumed that a sentence to be searched is a combination of a question sentence and an answer sentence corresponding to the question sentence. A search for a combination of a question sentence and an answer sentence is also called QA search. Hereinafter, the combination will be referred to as question-answer pair. In the QA search, the sentence database 200 stores a collection of questions and answers in which various question-answer pairs are accumulated as a collection of sentences. In the QA search, the acceptance unit 111 accepts an inquiry sentence in a question form as an inquiry sentence. The search unit 112 acquires a question sentence, an answer sentence, or a question-answer pair as the search result sentence. In the following embodiment, it is assumed that the search result sentence is a question-answer pair in order to provide specific description.

FIG. 3 is a diagram illustrating an example of a data structure of a collection of questions and answers. As illustrated in FIG. 3, a collection of questions and answers is an accumulation of question-answer pairs that are a combination of a question sentence and an answer sentence to the question sentence. Each question-answer pair is assigned with an ID number for uniquely identifying the question-answer pair. For example, the question-answer pair with the ID "1" includes a question sentence "When is the deadline to request for a patent proposal?", and the answer sentence "The deadline for the patent proposal request is . . . ". The question sentence and the answer sentence are usually manually input, but may be automatically input by a computer.

Figure 4:
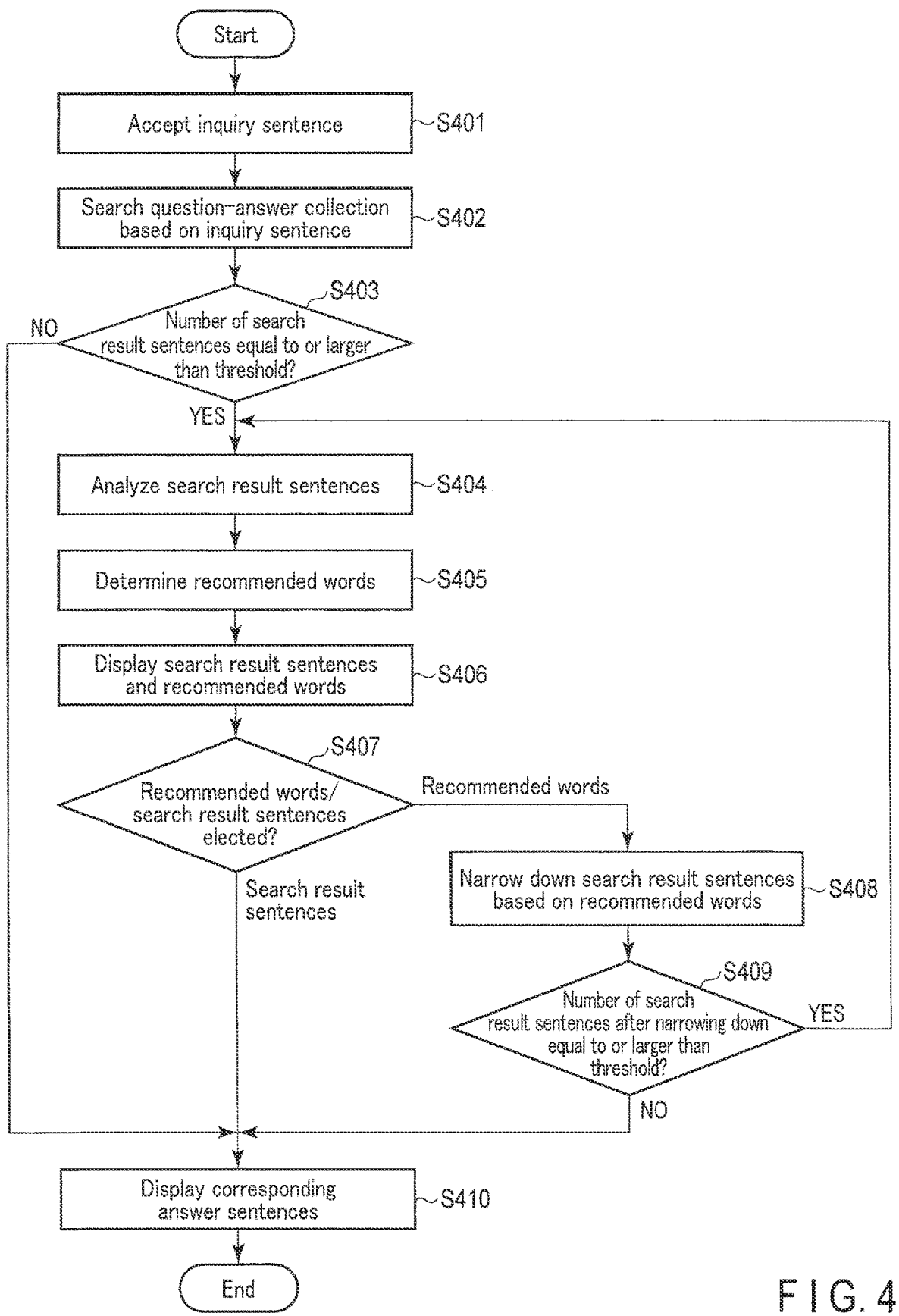
FIG. 4 is a diagram illustrating an example of a procedure for sentence search process.

FIG. 4 is a diagram illustrating an example of a procedure of the sentence search process by the sentence search apparatus 100. As illustrated in FIG. 4, the acceptance unit 111 accepts a character string (inquiry sentence) related to an inquiry from the user (step S401). An example of the procedure of step S401 is as follows. First, the user inputs an inquiry sentence via the input device of the client terminal 300. The client terminal 300 transmits the inquiry sentence to the sentence search apparatus 100. The communication device 14 of the sentence search apparatus 100 receives the inquiry sentence from the client terminal 300, and the acceptance unit 111 accepts the received inquiry sentence.

The search unit 112 searches a collection of questions and answers stored in the sentence database 200 based on the inquiry sentence accepted in step S401 (step S402). Then, the search unit 112 acquires a question-answer pair suitable for the inquiry sentence from among a plurality of question-answer pairs accumulated in the collection of questions and answers, as a search result sentence.

An example of the procedure of step S402 is as follows. First, the search unit 112 performs morphological analysis on the inquiry sentence, extracts words included in the inquiry sentence, and sets a search word from among the extracted words. For example, the search unit 112 sets a word belonging to a specific word class such as a noun or a verb among the extracted words, as the search word. As another example, usable search word candidates may be registered in each question-answer pair of the collection of questions and answers, and the search unit 112 may set a search word candidate registered in the collection of questions and answers among the extracted words, as the search word. As another example, the search unit 112 may set the entire inquiry sentence as the search words. Next, the search unit 112 searches the collection of questions and answers for the search word. Specifically, the search unit 112 specifies a question-answer pair including the search word from a plurality of question-answer pairs included in the collection of questions and answers, and acquires the specified question-answer pair from the collection of questions and answers, as a search result sentence. The question-answer pair including the search word may be a question-answer pair to which the question sentence including the search word belongs, may be a question-answer pair to which the answer sentence including the search word belongs, or may be a question-answer pair in which the question sentence and the answer sentence both includes the search word.

When step S402 is performed, the integrated control unit 116 determines whether the number of search result sentences acquired in step S402 is equal to or larger than a threshold (step S403). Specifically, in step S403, the integrated control unit 116 determines whether the number of question-answer pairs acquired as the search result sentences is equal to or larger than a threshold. If the search results are equal to or more than the threshold, it is necessary to narrow down the search results, that is, the search result sentences, and thus, steps S404 to S407 are performed. If the search results are less than the threshold, steps S404 to S407 are omitted. Typically, the threshold may be set to two, but may be set to three or more.

If the integrated control unit 116 determines in step S403 that the number of search result sentences is equal to or more than the threshold (step S403: YES), the analysis unit 113 performs sentence analysis on the search result sentences (step S404). The target of the sentence analysis may be a question sentence, an answer sentence, or both of the question sentence and the answer sentence in the question-answer pair as the search result sentence. The target of the sentence analysis can be arbitrarily set by the user or the like. In the following example, it is assumed that the target of the sentence analysis is a question sentence. The question sentence in the question-answer pair as the search result sentence will be referred to as search result question sentence. The analysis unit 113 acquires a dependency relation between words included in each search result question sentence by the sentence analysis. Details of the sentence analysis will be described later.

When step S404 is performed, the determination unit 114 determines one or more recommended words for narrowing down the search result sentences to a sentence desired by the user, based on the inquiry sentence accepted in step S401, the search result sentences acquired in step S402, and the dependency relation acquired in step S404 (step S405). The determination unit 114 determines, as the recommended word, any one of a word having a dependency relation with the search word among the words constituting the search result sentence, a subject or an object of the base word among the words constituting the search result sentence, and a word in an adverbial modifier clause of the base word among the words constituting the search result sentence. Details of determination on the recommended word will be described later.

When step S405 is performed, the display control unit 115 displays the search result sentences acquired in step S404 and the recommended word determined in steps S404 and S405 (step S406). As an example, the display control unit 115 displays an interactive screen on which the search result sentences and the recommended word are presented on the display device of the client terminal 300.

Figure 5:
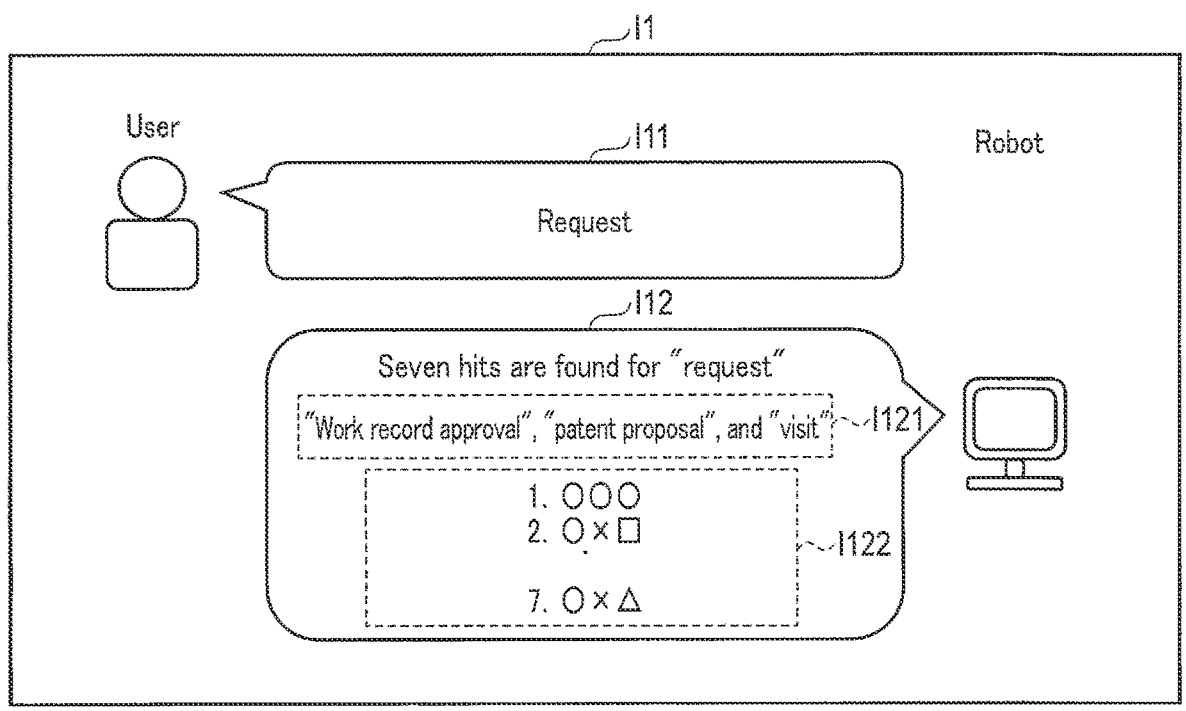
FIG. 5 is a diagram illustrating an example of an interactive screen in step S406 of FIG. 4.

FIG. 5 is a diagram illustrating an example of an interactive screen I1 in step S406. As illustrated in FIG. 5, the interactive screen I1 includes a message display field I11 on the user side and a message display field I12 on the robot side. The robot means a chatbot implemented by the sentence search apparatus 100. On the interactive screen I1, messages on the user side and messages on the robot side are displayed in a time-series in an interactive manner. The inquiry sentence accepted in step S401 is displayed in the message display field I11. The recommended word I121 determined in step S405 and the search result sentence I122 acquired in step S402 are displayed in the message display field I12. A search result question sentence is preferably displayed as the search result sentence I122.

In the example of FIG. 5, the inquiry sentence is "Request". The sentence search apparatus 100 determines the search word "request" based on the inquiry sentence, and acquires seven search result sentences I122 based on the search word. The number of the search result sentences I122 is equal to or larger than the threshold, and three recommended words I121 of "work approval", "patent proposal", and "visit" are determined. The search result sentences I122 and the recommended words I121 thus obtained are individually and selectively displayed in the message display field I12. A question sentence is typically displayed as the search result sentence I122. However, the present embodiment is not limited thereto, and an answer sentence may be displayed, or both the question sentence and the answer sentence may be displayed.

If a large number of search result sentences I122 is displayed in the message display field I12 and the user desires to narrow down the search result sentences I122, the user selects the recommended word I121 via the input device of the client terminal 300 or the like. On the other hand, if the search result sentence to be applied to the user's inquiry is found from the search result sentences I122 displayed in the message display field I12, the user selects the desired search result sentence I122 via the input device of the client terminal 300 or the like.

When step S406 is performed, the integrated control unit 116 determines which of the recommended word and the search result sentence has been selected (step S407). In a case where the recommended word has been selected (step S407: recommended word), the integrated control unit 116 causes the search unit 112 to execute step S408. The search unit 112 narrows down the search result sentences based on the recommended word selected in step S407 (step S408). Specifically, in step S408, the search unit 112 extracts a question-answer pair including the selected recommended word from among a plurality of question-answer pairs. As an example, the search unit 112 specifies a search result question sentence including the selected recommended word from among a plurality of question-answer pairs, and extracts a question-answer pair to which the specified search result question sentence belongs.

When step S408 is performed, the integrated control unit 116 determines whether the number of search result sentences after narrowing down is equal to or larger than a threshold (step S409). Specifically, in step S409, the integrated control unit 116 determines whether the number of search result sentences after narrowing down is equal to or larger than a threshold. If the number of search result sentences is equal to or more than the threshold, it is necessary to further narrow down the search result sentences. Therefore, steps S404 to S407 are performed again for the search result sentences after narrowing down. If the search results are less than the threshold, steps S404 to S407 are omitted. Typically, the threshold may be set to two, but may be set to three or more.

In this manner, steps S404 to S409 are repeated until the search result sentence is selected in step S407 or it is determined in step S409 that the number of search result sentences after narrowing down is not equal to or larger than the threshold.

Then, if determining in step S403 that the number of search result sentences is not equal to or larger than the threshold (step S403: NO), if the search result sentence is selected in step S407 (step S407: search result sentences), or if determining in step S409 that the number of search result sentences after narrowing down is not equal to or larger than the threshold (step S409: NO), the integrated control unit 116 causes the display control unit 115 to execute step S410. The display control unit 115 displays an answer sentence corresponding to the search result sentence (hereinafter, corresponding answer sentence) (step S410). As an example, the display control unit 115 displays an interactive screen on which the corresponding answer sentence is presented on the display device of the client terminal 300.

Figure 6:
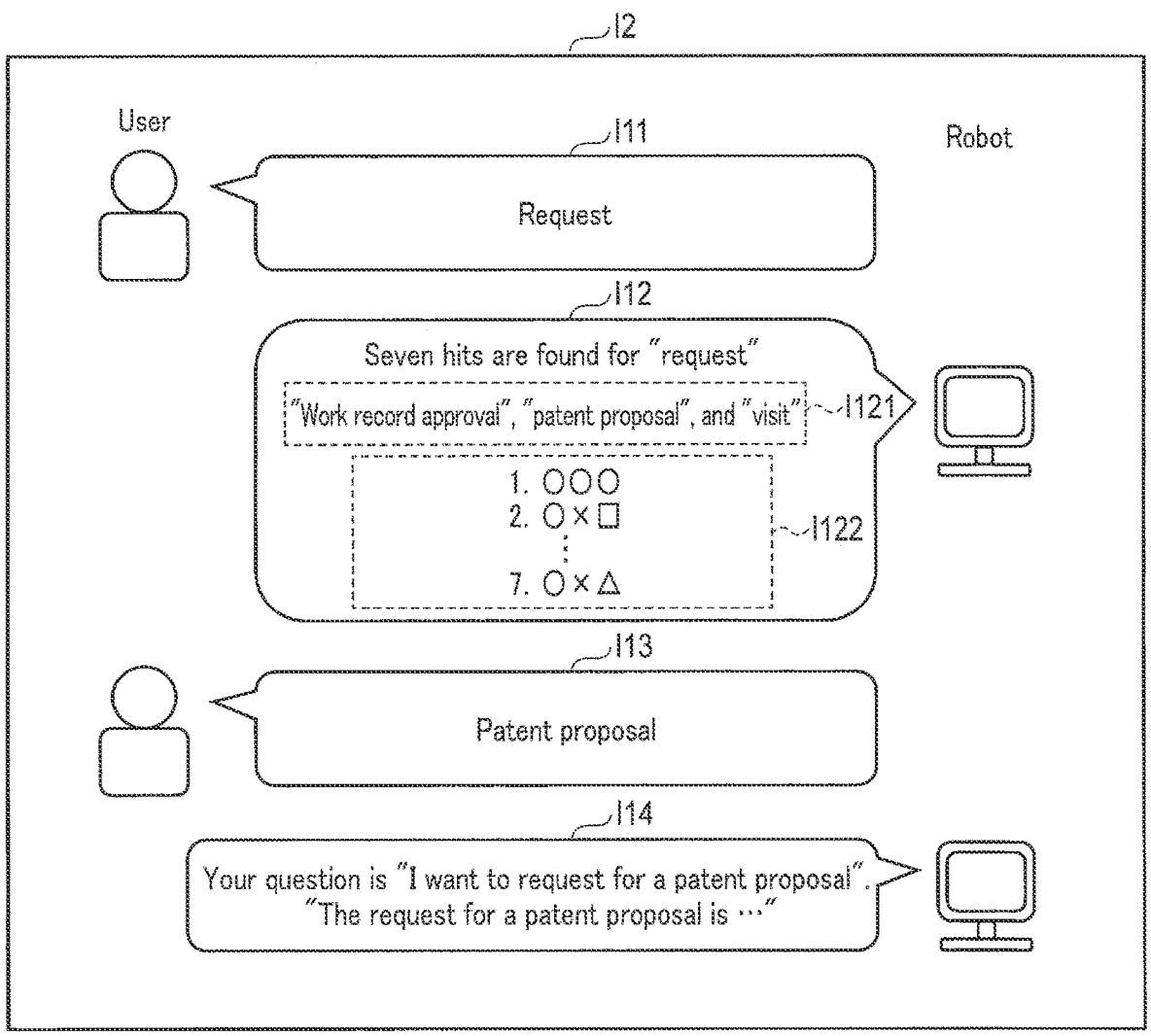
FIG. 6 is a diagram illustrating an example of an interactive screen in step S410 of FIG. 4.

FIG. 6 is a diagram illustrating an example of an interactive screen I2 in step S410. The interactive screen I2 illustrated in FIG. 6 is a continuation of the interactive screen I1 illustrated in FIG. 5. In the example of FIG. 6, among three recommended words I121 of "work record approval", "patent proposal", and "visit", "patent proposal" is selected. In this case, the selected recommended word "patent proposal" is displayed in the message display field I13. In step S408, the search unit 112 narrows down the seven question-answer pairs based on the selected recommended word "patent proposal". In the example of FIG. 6, one question-answer pair is extracted as a result of narrowing. In this case, since the number of question-answer pair after narrowing down is less than the threshold (two) (step S409: NO), the corresponding answer sentence among the question-answer pair after narrowing down is displayed in the message display field I14 on the robot side.

As described above, in the first embodiment, since the recommended word is determined using the dependency relation between the words included in the search result sentence, it is possible to present an accurate recommended word in consideration of the structure of the search result sentence and the grammatical relation between the words. Since the accurate recommended word is displayed, the user can easily and efficiently find the search result sentence desired by the user.

When step S410 is performed, the sentence search process is ended.

Next, the sentence analysis process according to step S404 and the recommended word determination process according to step S405 will be described in detail. First, a sentence analysis process and a recommended word determination process according to a comparative example will be described. In the comparative example, the recommended word is determined based on the degree of appearance of each word included in the search result sentence.

Figure 18:
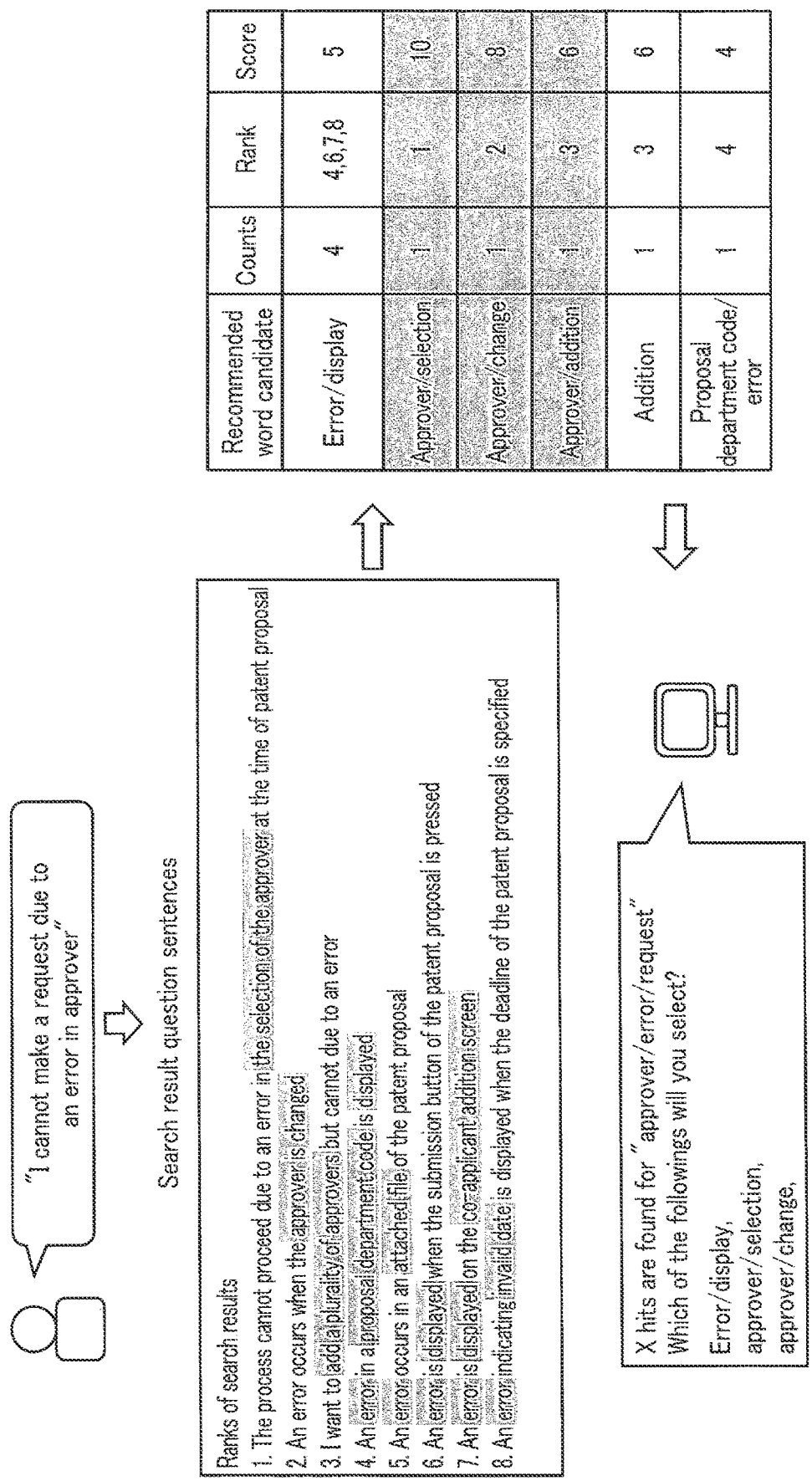
FIG. 18 is a diagram illustrating an operation example according to a fifth embodiment.
Figure 19:
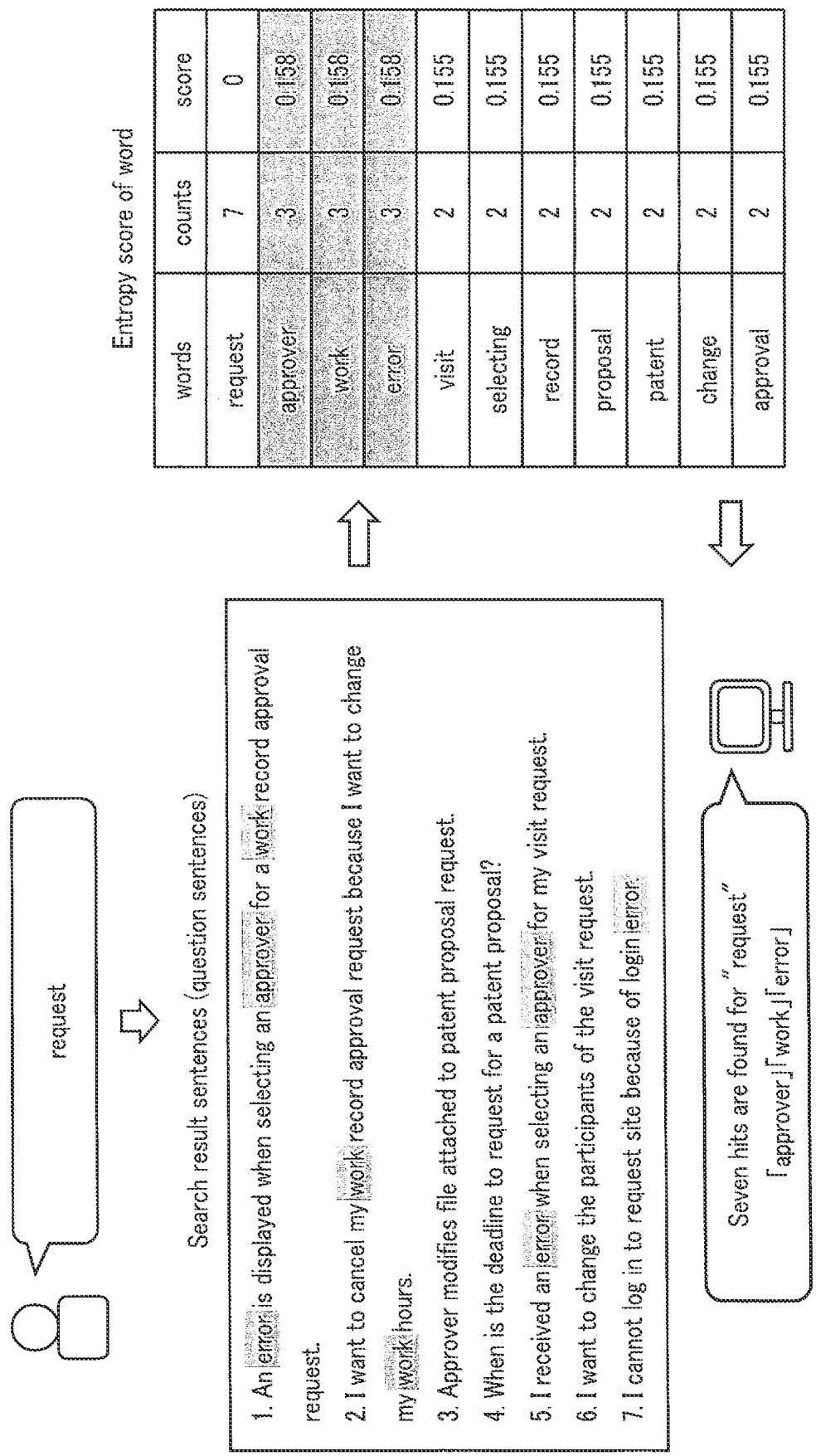
FIG. 19 is a diagram illustrating a sentence analysis process and a recommended word determination process according to a comparative example.

FIG. 19 is a diagram illustrating the sentence analysis process and the recommended word determination process according to the comparative example. As illustrated in FIG. 18, the inquiry sentence is "Request", and the search word is "Request". Based on the search word "Request", seven search result sentences (question-answer pairs) including the character string "Request" are acquired. The search result question sentences of the question-answer pairs are "An error is displayed when selecting an approver for a work record approval request.", "I want to cancel my work record approval request because I want to change my work hours.", "Approver modifies file attached to patent proposal request.", "When is the deadline to request for a patent proposal?", "I received an error when selecting an approver for my visit request.", "I want to change the participants of the visit request.", and "I cannot log in to request site because of login error.". Reference signs assigned to the question-answer pairs illustrated in FIG. 19 are ID numbers.

The determination unit 114 according to the comparative example determines a recommended word based on the degree of appearance of each word included in each search result question sentence. A specific processing procedure is as follows. First, the determination unit 114 decomposes each search result question sentence into words, and counts the number of appearances of each word included in all the acquired search result question sentences. Then, the determination unit 114 calculates an entropy score based on the number of appearances of each word. An entropy score y is an example of an index value for evaluating the value of the word. As an example, the entropy score y is calculated according to the following formula (1) based on the number of appearances and the number of search results. The number of search results means the number of search result question sentences. In the present case, the number is seven.

The entropy scores of the words included in the search result question sentences are as illustrated in the table of FIG. 19.

$$y = -p \cdot \log(p) \quad (1)$$

$p$ = the number of appearances/number of search results

In this case, the determination unit 114 determines the recommended word based on the entropy score of each word included in the seven search result question sentences. Typically, any number of recommended words whose entropy scores are in the designated ranks are selected from among the words included in the seven search result question sentences. For example, in the example of FIG. 19, three words "approver", "work", and "error" whose entropy scores tie for first place are selected as recommended words. Among the characters included in the search result question sentences in FIG. 19, the words for which the entropy score is to be calculated are shown in bold, and the recommended words are shown in gray.

As in the search result question sentences exemplified in FIG. 19, if sentences having similar intentions are inconsistent in expression, or an additional expression less relevant to the intention expressed by a sentence is inserted into the sentence, it is not possible to select an appropriate recommended word only from the viewpoint of the degree of appearance. In addition, the user may be interested in a search result question sentence with a low degree of appearance, and in this case as well, it is not possible to select an appropriate recommended word only from the viewpoint of the degree of appearance.

Therefore, the determination unit 114 according to the present embodiment selects a recommended word based on a dependency relation between words constituting the search result question sentence. Hereinafter, some examples of the sentence analysis process and the recommended word determination process according to the present embodiment will be described.

Example 1

A determination unit 114 according to Example 1 determines a recommended word from words in a dependency relation with a search word among words included in a search result sentence.

Figure 7:
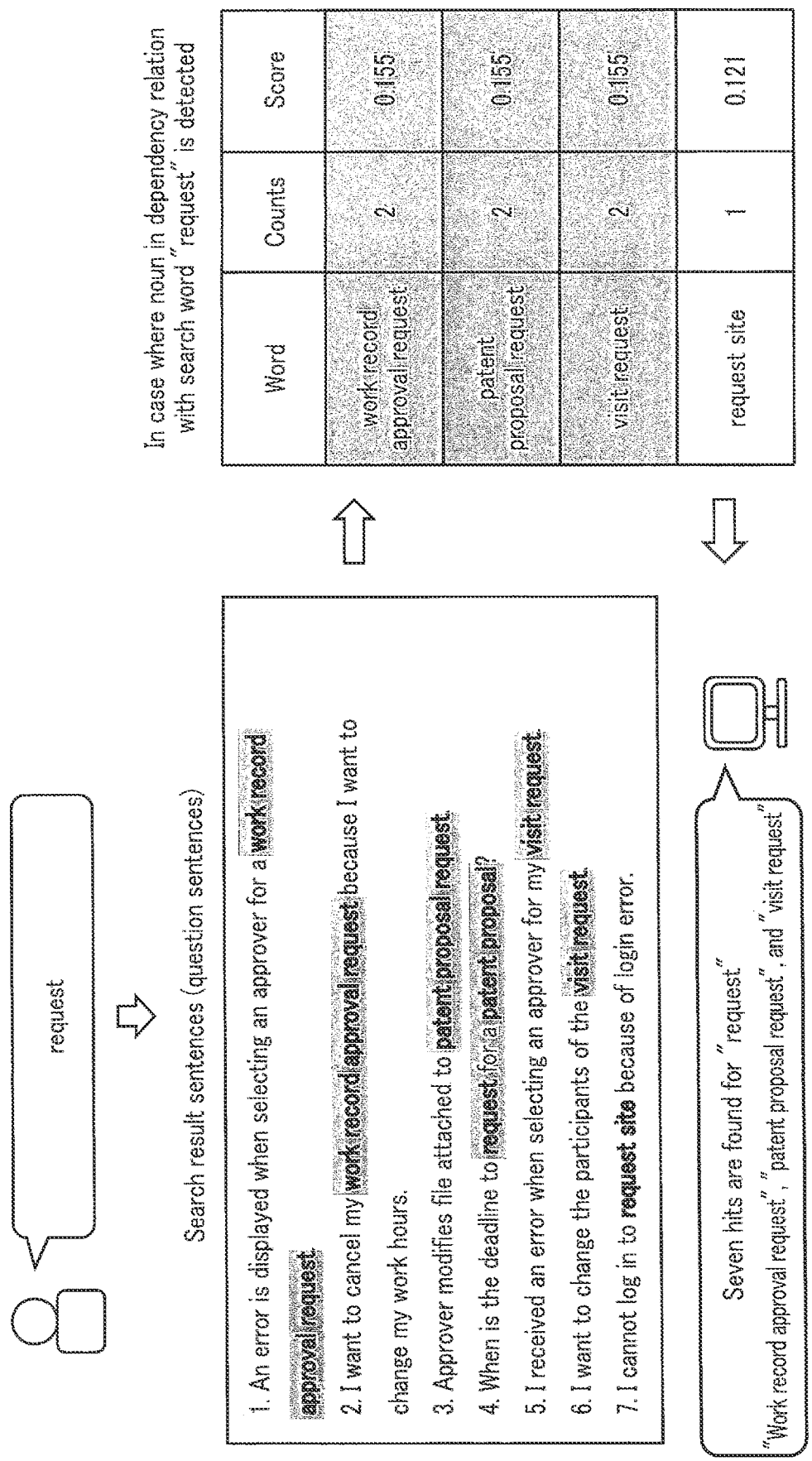
FIG. 7 is a diagram illustrating a sentence analysis process and a recommended word determination process according to a first example.

FIG. 7 is a diagram illustrating the sentence analysis process and the recommended word determination process according to Example 1. The inquiry sentence, the search words, and the search result sentences illustrated in FIG. 7 are the same as those in the comparative example illustrated in FIG. 19.

In a case where a search unit 112 acquires the search result question sentences, an analysis unit 113 performs sentence analysis on each search result question sentence to acquire a dependency relation between words included in each search result sentence. As the dependency relation, at least the presence or absence of connection between words and grammatical relevance are acquired. The connection means that two words are in a relation between a dependency source and a dependency destination. The grammatical relevance is a grammatical relevance between a dependency source and a dependency destination, and means a relation (modification relation) between a modified word and a modifier or a relation between a subject and a predicate, for example.

FIG. 8 is a diagram illustrating an analysis result of a search result question sentence "An error is displayed when selecting an approver for a work record approval request." by sentence analysis according to Example 1. As illustrated in FIG. 8, the analysis unit 113 performs morphological analysis on the search result question sentence to decompose the search result question sentence into words, and determines the word classes of the words, that is, noun, particle, verb, auxiliary verb, and the like. The analysis unit 113 specifies a search word from among the plurality of words included in the search result question sentence. In the case of FIG. 8, the analysis unit 113 specifies the search word "request". The analysis unit 113 then performs sentence analysis such as dependency parsing on the search result question sentence, and specifies a word in a dependency relation with the search word "request". As the sentence analysis, dependency parsing, syntax parsing, and/or graph-based ranking method may be used. In the case of the search result question sentence illustrated in FIG. 8, "work record approval" is specified as a noun modified by the search word "request". If there is a word in a subject or predicate relation with the search word "request", the word is also specified as a word in a dependency relation with the search word "request".

The analysis unit 113 performs the sentence analysis illustrated in FIG. 8 on each search result question sentence and specifies words in a dependency relation with the search word "request". The determination unit 114 acquires words in a dependency relation with the search word "request" from each search result question sentence, as recommended word candidates.

The number of connection(s) of words specified as the recommended word candidates can be arbitrarily set. The number of connection(s) corresponds to the number of dependency relation(s) that intervene between the final dependency destination and the search word in a case where words in a dependency relation are sequentially specified with the search word as a base point. In the example of FIG. 8, the number of connection is set to one. However, consecutive "compound" links are always concatenated regardless of the limit on the number of connections. As a result, "work record approval" is selected as a recommended word candidate as a word connected to the search word "request". The presence or absence of particle(s) makes a slight difference, and has a low degree of influence on the meaning represented by the word. Therefore, when the recommended word candidate is selected, prepositions and articles are omitted.

The determination unit 114 calculates a score for each recommended word candidate based on the number of appearances of the recommended word candidate. The score can be calculated based on the number of appearances of the recommended word candidate appearing in the search result question sentence. The score based on the number of appearances can be calculated as the entropy score according to the above formula (1). Here, the score may be calculated using the number of appearances of the word as it is, or may be calculated using the probability of appearance obtained by dividing the number of appearances by the number of search results. As another example, the score may be calculated based on the number of question-answer pairs to which the recommended word candidate belongs. FIG. 7 illustrates examples of scores of nouns in a modification relation with the search word "request".

The determination unit 114 then selects, from among the recommended word candidates, a recommended word whose score satisfies a selection criterion. The selection criterion is that the score is in the designated rank or is equal to or greater than a threshold, for example. For example, as illustrated in FIG. 7, three nouns with scores in the first rank, that is, "work record approval request", "patent proposal request", and "visit request" are selected as recommended words. The selected recommended words "work approval application", "patent proposal request", and "visit application" are displayed on the client terminal 300 or the like by the display control unit 115 in order to narrow down the search result question sentences.

At the time of display of the recommended word, the display control unit 115 may display the search result sentences (question sentences) illustrated in FIG. 7. At this time, the display control unit 115 may display the relation between the recommended word and words different from the recommended word among the words constituting the search result sentences. For example, the display control unit 115 may display the recommended word so as to be visually distinguished from other words. Although the recommended word is displayed in gray in FIG. 7, the recommended word may be displayed using a visual effect of another color or font. This allows the user to easily check the recommended word in the search result sentence. As another example, the display control unit 115 may display a word specified as the recommended word candidate so as to be visually distinguished from other words. Although the words specified as the recommended word candidates in FIG. 7 are displayed in bold, these words may be displayed using a visual effect of another font or color.

The display control unit 115 may display a relation between the recommended word and other words. For example, the display control unit 115 may display sentence analysis results of a search result sentence as illustrated in FIG. 8. Specifically, the display control unit 115 may display an arrow indicating the presence or absence of connection between words included in the search result sentence, and a character string or a symbol indicating a grammatical relation between words included in the search result sentence. In addition, the display control unit 115 may display a search word or a recommended word included in the search result sentence so as to be visually distinguished from other words. By displaying the sentence analysis result, the basis for selecting the recommended word can be presented to the user. This improves the user's convenience of selection of a recommended word and convenience of narrowing-down search.

An upper limit may be set for the number of recommended words. The value of the upper limit is not particularly limited, and may be set to any value from about 1 to 5. Of course, six or more may be set as the upper limit. The determination unit 114 selects a number of recommended words less than the upper limit. Specifically, if the number of recommended word candidates satisfying the selection criterion does not exceed the upper limit, the determination unit 114 selects the recommended words candidate as the recommended word candidates. On the other hand, if the number of recommended word candidates satisfying the selection criterion exceeds the upper limit, the determination unit 114 changes the content of the selection criterion such that the number of recommended word candidates does not exceed the upper limit. For example, the rank of the score is raised or the threshold is increased. Then, the determination unit 114 selects recommended word candidates that satisfy the changed selection criteria as recommended words. Providing the upper limit makes it possible to decrease the number of displayed recommended words and improve the user's convenience in selecting the recommended words.

According to Example 1, utilizing not only the number of appearances of each word but also the grammatical relation between words makes it possible to select a more appropriate word as the recommended word for the narrowing-down search. This is because the word in a dependency relation with the search word "request" is a modification expression of the word. In general, adding a modification expression to a word makes the meaning of the word more detailed. Since it is possible to find a word that grammatically modifies the search word by analyzing the dependency relation, it is possible to present an appropriate recommended word for the inquiry sentence input by the user.

Example 2

A determination unit 114 according to Example 2 determines a subject or an object of a word serving as a base point (hereinafter, base word) among the words included in a search result sentence, as a recommended word. Hereinafter, Example 2 will be described. Description of parts in common to the first embodiment such as display process of a recommended word will be omitted.

FIG. 9 is a diagram illustrating a sentence analysis process and a recommended word determination process according to Example 2. The inquiry sentence, the search words, and the search result sentences illustrated in FIG. 9 are the same as those illustrated in FIG. 7. If the search unit 112 acquires search result sentences, an analysis unit 113 performs sentence analysis on each search result question sentence and specifies a subject or object of the base word.

Figure 10:
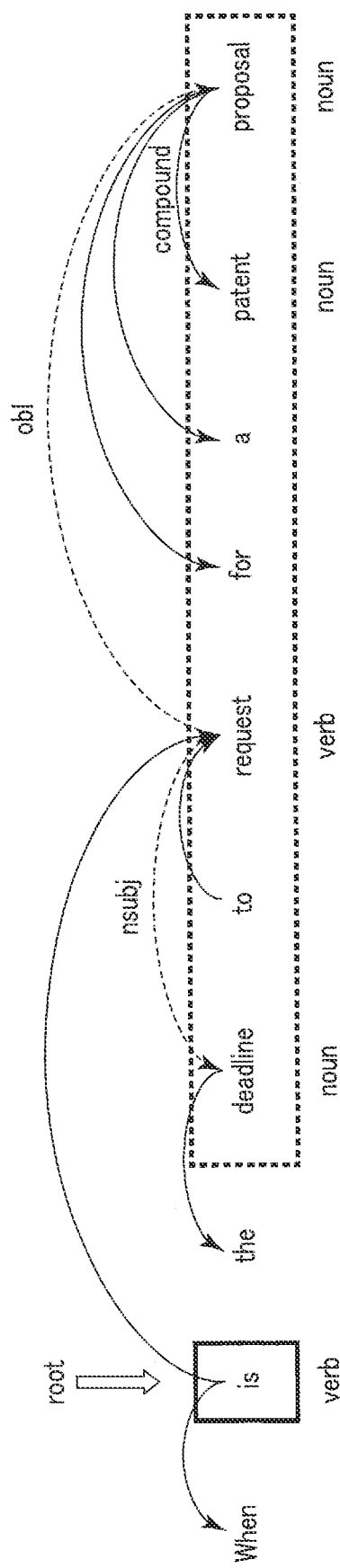
FIG. 10 is a diagram illustrating an analysis result of a search result question sentence "When is the deadline to request for a patent proposal?".

FIG. 10 is a diagram illustrating results of sentence analysis of a search result question sentence "When is the deadline to request for a patent proposal?" according to Example 2. As illustrated in FIG. 10, the analysis unit 113 performs morphological analysis on the search result question sentence to decompose the search result question sentence into words, and determines the word classes of the words. The analysis unit 113 specifies a search word from among the plurality of words included in the search result question sentence. In the case of FIG. 10, the analysis unit 113 specifies the search word "request". The analysis unit 113 then performs sentence analysis such as dependency parsing on the search result question sentence, and specifies a word in a dependency relation with the search word "request". As the sentence analysis, dependency parsing, syntax parsing, and/or graph-based ranking method may be used. Next, the analysis unit 113 specifies the base word based on the dependency relation. The base word is also called "root", and is a word located at a vertex in a tree structure of a dependency relation. The base word corresponds to the word the sentence essentially concerns. For example, in the case of the search result question sentence "When is the deadline to request for a patent proposal?", the base word is "is". Then, the analysis unit 113 specifies a subject or object of the base word. The subject is the word connected to the base word by "nsubj" links, and the object is the word connected to the base word by "obj" links. If there is no subject or object directly connected to the base word, the subject and object of the verb to which the base word is connected are substituted. The subject or object of the base word represents a target asked by the sentence. The base word may match the search word, but this is also acceptable.

The analysis unit 113 performs the sentence analysis illustrated in FIG. 10 on each search result question sentence and specifies the subject or object of the base word in each search result question sentence. Then, the determination unit 114 selects the subject or object of the specified base word as a recommended word candidate. At this time, the determination unit 114 simultaneously acquires and connects not only a word in a dependency relation with the base word but also a word modifying the word. This is because the word is more easily understood by humans. For example, in addition to the verb "request" connected to the base word "is", "deadline" that is the subject of "request", "proposal" that is in a dependency relation with "request", and "patent" is a modifier of the "proposal" are connected, and the word "deadline to request patent proposal" is selected as a recommended word candidate. As in Example 1, prepositions and articles are excluded. The number of connections can be arbitrarily set.

The method according to Example 2 makes it possible to obtain a target word that each search result question sentence essentially concerns as a recommended word candidate. That is, it is possible to present what the user wishes to inquire with the recommended word. If what the user wishes to inquire appears in the recommended word, it is possible to accurately narrow down the search result question sentences by selecting the recommended word. The determination unit 114 then selects, from among the recommended word candidates, a recommended word whose score satisfies a selection criterion. The same selection criterion as in the first embodiment may be used. The recommended word is displayed on the client terminal 300 by the display control unit 115.

Example 3

A determination unit 114 according to Example 3 determines an adverbial modifier clause of the base word among the words included in a search result sentence, as the recommended word. Hereinafter, Example 3 will be described. Description of parts in common to the first embodiment such as display process of a recommended word will be omitted.

FIG. 11 is a diagram illustrating a sentence analysis process and a recommended word determination process according to Example 3. The inquiry sentence, the search words, and the search result sentences illustrated in FIG. 11 are the same as those illustrated in FIG. 7. If a search unit 112 acquires search result sentences, an analysis unit 113 performs sentence analysis on each search result sentence and specifies an adverbial modifier clause of the base word.

Figure 12:
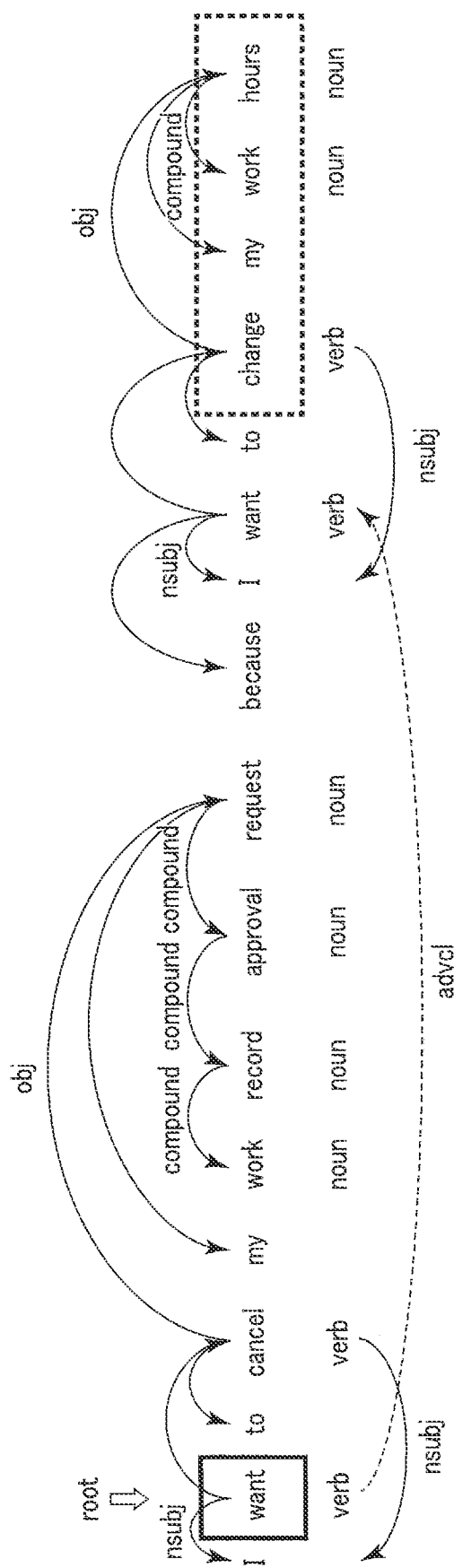
FIG. 12 is a diagram illustrating an analysis result of a search result question sentence "I want to cancel my work record approval request because I want to change my work hours".

FIG. 12 is a diagram illustrating an analysis result of a search result question sentence "I want to cancel my work record approval request because I want to change my work hours" by sentence analysis according to Example 3. As illustrated in FIG. 12, the analysis unit 113 performs morphological analysis on the search result question sentence to decompose the search result question sentence into words, and determines the word classes of the words. The analysis unit 113 specifies a search word from among the plurality of words included in the search result question sentence. In the case of FIG. 12, the analysis unit 113 specifies the search word "request". The analysis unit 113 then performs sentence analysis such as dependency parsing on the search result question sentence, and specifies a word in a dependency relation with the search word "request". As the sentence analysis, dependency parsing, syntax parsing, and/or graph-based ranking method may be used. Next, the analysis unit 113 specifies the base word based on the dependency relation. Then, the analysis unit 113 specifies an adverbial modifier clause of the specified base word. The adverbial modifier clause is an expression such as "for", "when", "in the case of", or "by", which often represents "reason, background, and description of situation" in a sentence. For example, in the case of the search result question sentence "I want to cancel my work record approval request because I want to change my work hours", "want (I want to cancel)" is specified as the base word, and "I want to change my work hours" is an adverbial modifier clause. As in Example 1, prepositions and articles are excluded. Pronouns and common verbs that are not needed as search terms are also excluded. The number of connections can be arbitrarily set.

The analysis unit 113 performs the sentence analysis illustrated in FIG. 12 on each search result question sentence and specifies an adverbial modifier clause of the base word in each search result question sentence. Then, the determination unit 114 selects an adverbial modifier clause of the specified base word as a recommended word candidate. As a recommended word candidate, a word string of a plurality of words constituting the adverbial modifier clause may be selected, or a word belonging to a specific word class such as a noun or a verb among the plurality of words may be selected. The determination unit 114 then selects, from among the recommended word candidates, a recommended word whose score satisfies a selection criterion. The same selection criterion as in the first embodiment may be used. The recommended word is displayed on the client terminal 300 by the display control unit 115.

According to Example 3, it is possible to obtain the "reason, background, and description of situation" indicating why the question sentence such as the search result question sentence has been made. That is, it is possible to respond with the recommended word to "why" the user has wished to make an inquiry. If a situation in which the user is in trouble is represented in the recommended word, it is possible to accurately narrow down the search result question sentences by selecting the situation.

Others

Examples 1, 2, and 3 can be appropriately combined. That is, the determination unit 114 may select, as a recommended word, one or more candidates matching the selection criterion from among the recommended word candidates (the words in a dependency relation with the search word) selected according to Example 1, the recommended word candidate (the subject or object of the base word) selected according to Example 2, and the recommended word candidate (the adverbial modifier clause of the base word) selected according to Example 3. The selection criterion may be set such that the score is in a higher designated rank, the score is equal to or higher than a threshold, or the like.

The first embodiment can be variously modified. For example, the use mode of the recommended word is not limited only to presentation to the user. As an example, the search unit 112 may automatically narrow down the search result question sentences based on the recommended word, without displaying the recommended word by the display control unit 115. Although the sentence database 200 is assumed to be a computer different from the sentence search apparatus 100, the sentence database 200 may be included in the sentence search apparatus 100 as another modification. Similarly, although the client terminal 300 is assumed to be a computer different from the sentence search apparatus 100, the client terminal 300 may be included in the sentence search apparatus 100.

Summarization

The sentence search apparatus 100 according to the first embodiment includes an acceptance unit 111, a search unit 112, an analysis unit 113, and a determination unit 114. The acceptance unit 111 accepts a character string (inquiry sentence) input by the user. The search unit 112 searches a sentence collection in which a plurality of sentences to be searched is accumulated based on the inquiry sentence, and acquires one or more search result sentences matching the inquiry sentence. The analysis unit 113 performs sentence analysis on the search result sentence to acquire a dependency relation between words constituting the search result sentence. The determination unit 114 determines one or more recommended words to narrow down the search result sentences to a sentence desired by the user, based on the inquiry sentence, the search result sentences, and the dependency relation.

According to the above configuration, since the recommended word is determined in consideration of the dependency relation between the words in the search result sentence, it is possible to determine the word representing the content substantially asked by the user not included in the inquiry sentence as the recommended word, in comparison with the recommended word selected based on the appearance degree of each word in the search result sentence. Using such a recommended word makes it possible to perform the interactive sentence search in a more efficient manner.

Second Embodiment

A determination unit 114 according to a second embodiment determines a recommended word by combining Examples 1 to 3 and the comparative example. Hereinafter, the second embodiment will be described. In the following description, components having substantially the same functions as those of the first embodiment are denoted with the same reference numerals, and redundant description will be given only when necessary. In addition, description of parts in common with the first embodiment such as the process procedure of the interactive search and the display process of the recommended word will be omitted.

The determination unit 114 according to the second embodiment determines one or more first recommended word candidates based on the inquiry sentence, the search result sentence, and the dependency relation acquired by an analysis unit 113, determines one or more second recommended word candidates based on the inquiry sentence, the search result sentence, and the degree of appearance of each word constituting the search result sentence, and determines a recommended word based on the first recommended word candidate(s) and the second recommended word candidate(s). The first recommended word candidate(s) are recommended word candidate(s) determined in Examples 1 to 3 as illustrated in FIGS. 7, 9, and 11. The second recommended word candidate(s) are recommended word candidate(s) determined by the comparative example as illustrated in FIG. 19.

There are various methods for making a combination. As an example, the determination unit 114 calculates a first score for the first recommended word candidate, calculates a second score for the second recommended word candidate, and calculates a total score of the first score and the second score for each recommended word candidate. The determination unit 114 then selects a word whose total score meets a selection criterion as a recommended word.

A total score TS can be calculated by a weighted sum of the first score S1 and the second score S2 as expressed in the following formula (2). Appropriately setting the weights allows the recommended word candidates determined in Examples 1 to 3 to be regarded as more important than the recommended word candidates determined in the comparative example. For example, a weight w1 to the first score S1 may be set heavier than a weight w2 for the second score S2.

$$TS = w1 \cdot S1 + w2 \cdot S2 \qquad (2)$$

Both the first score and the second score are not necessarily calculated for each word constituting the search result sentence. Some word may be selected as both the first recommended word candidate and the second recommended word candidate, may be selected as only one of the first recommended word candidate and the second recommended word candidate, or may not be selected as the first recommended word candidate or the second recommended word candidate.

According to the second embodiment, a recommended word candidate is determined based on the recommended word candidates determined by Examples 1 to 3 and the recommended word candidates determined by the comparative example. As a result, in addition to the dependency parsing according to Examples 1 to 3, it is possible to determine the recommended word in consideration of the number of appearances of words constituting the search result sentence according to the comparative example.

Third Embodiment

A determination unit 114 according to a third embodiment deletes a recommended word similar to other recommended words from a plurality of recommended words. In other words, the determination unit 114 selects one representative recommended word from a group of recommended words in a similarity relation among a plurality of recommended words. Hereinafter, the third embodiment will be described. In the following description, components having substantially the same functions as those of the first embodiment are denoted with the same reference numerals, and redundant description will be given only when necessary. In addition, description of parts in common with the first embodiment such as the process procedure of the interactive search and the display process of the recommended word will be omitted.

Figure 13:
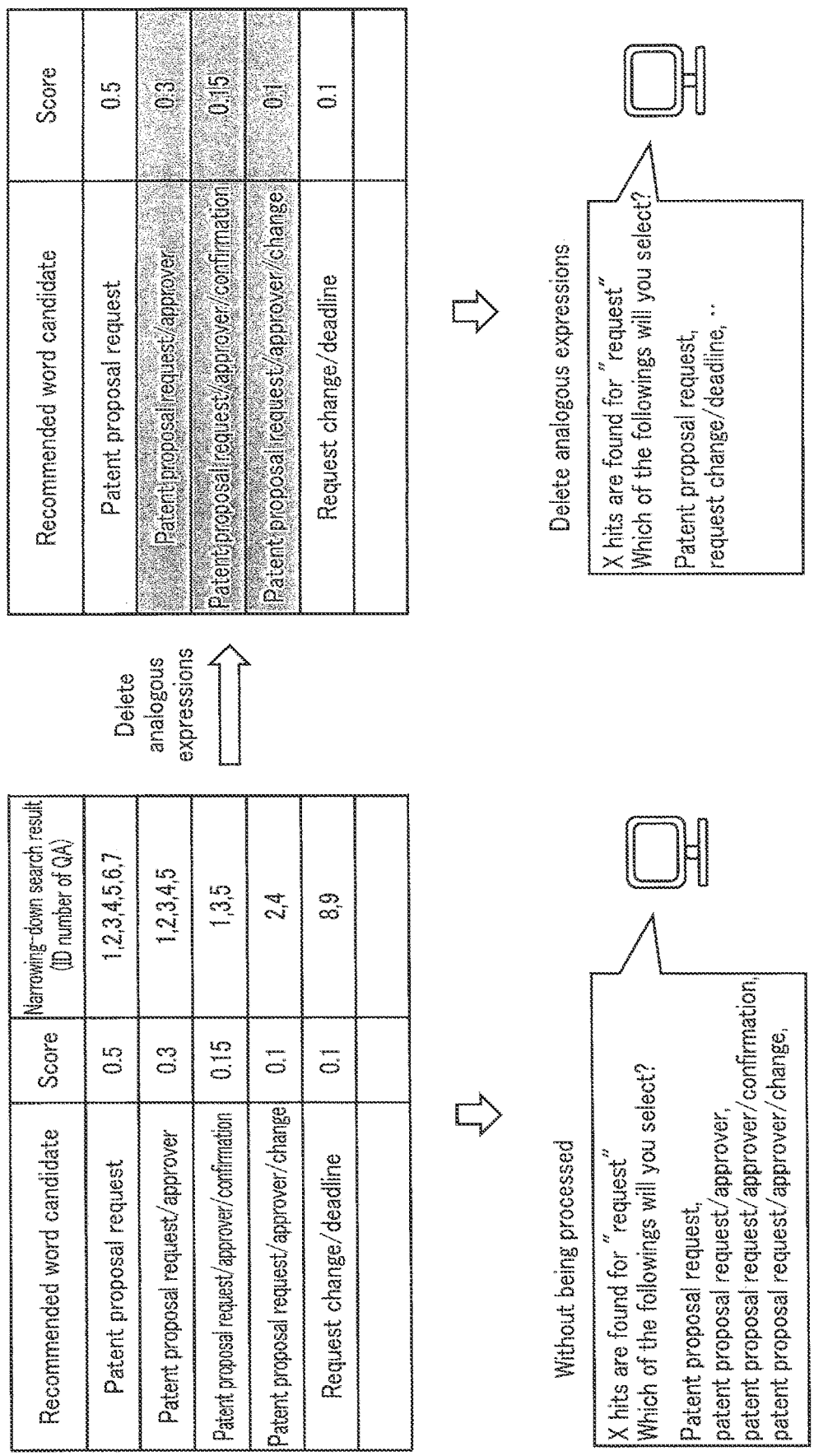
FIG. 13 is a diagram illustrating an operation example according to a third embodiment.

FIG. 13 is a diagram illustrating an operation example according to the third embodiment. As illustrated in the upper left table of FIG. 13, five recommended word candidates are specified and scores are calculated for the recommended word candidates. The narrowing-down search results mean ID numbers of question-answer pairs (QAs) to which the recommended word candidates belong. The ID numbers correspond to the ID numbers illustrated in FIGS. 7, 9, and 11. For example, the recommended word "patent proposal request/approver" has a score of "0.3" and has a narrowing-down search result "1, 2, 3, 4, 5". In the case of FIG. 13, the recommended words having higher scores have a larger number of hits as the narrowing-down search results than the recommended words having lower scores.

The recommended word candidates may include the same word or notation. In the third embodiment, the recommended word candidates partially including the same word or notation have an analogous relation. If "patent proposal request", "patent proposal request/approver", "patent proposal request/approver/confirmation", and "patent proposal request/approver/change", which are ranked in the top four of the five recommended words, are displayed as they are, only words including the same word "patent proposal request" are presented as recommended words. As can be seen from the narrowing-down search results, the recommended word candidates in an analogous relation overlap in the question-answer pair to which they belong. Therefore, even if recommended word candidates in an analogous relation are presented as recommended words, it is not expected to improve the effect of narrowing down the question-answer pairs.

For example, the narrowing-down search result of "patent proposal request" is "1, 2, 3, 4, 5, 6, 7", the narrowing-down search result of "patent proposal request/approver" is "1, 2, 3, 4, 5", the narrowing-down search result of "patent proposal request/approver/confirmation" is "1, 3, 5", and the narrowing-down search result of "patent proposal request/approver/change" is "2, 4". Thus, there is no difference in the range of the question-answer pair to which the recommended word belongs between the case of presenting only "patent proposal request" as the recommended word and the case of presenting "patent proposal request", "patent proposal request/approver", "patent proposal request/approver/confirmation", and "patent proposal request/approver/change" as the recommended words. That is, "patent proposal request/approver", "patent proposal request/approver/confirmation", and "patent proposal request/approver/change" can be said to have smaller contribution to or add lower value to narrowing down. Instead, presenting "request change/deadline" that has the narrowing-down search result "8, 9" as the recommended word has larger contribution to narrowing down.

Therefore, the determination unit 114 according to the third embodiment deletes a recommended word candidate partially including the same word or notation as a certain recommended word candidate. First, the determination unit 114 specifies two or more recommended word candidates including the same word or notation from among a plurality of recommended word candidates, and recognizes the specified two or more recommended word candidates as being in an analogous relation. The determination unit 114 then leaves one of the two or more recommended word candidates in an analogous relation, and deletes the remainder. Which of the recommended word candidates to leave may be determined by an arbitrary criterion. As an example, the determination unit 114 may leave the recommended word candidate having the highest score and delete the other recommended word candidates. This is because a higher score is considered to be more valuable as a recommended word. As another example, the determination unit 114 may leave a recommended word candidate having the largest number of question-answer pairs to which it belongs and delete the other recommended word candidates.

In the example of FIG. 13, "patent proposal request", "patent proposal request/approver", "patent proposal request/approver/confirmation", and "patent proposal request/approver/change" include the same word "patent proposal request", and thus they are in an analogous relation. Then, the "patent proposal request" to which the largest number of question-answer pairs belong is left, and the other "patent proposal request/approver", "patent proposal request/approver/confirmation", and "patent proposal request/approver/change" are deleted. As a result, "patent proposal request" and "request change/deadline" are determined and displayed as recommended words.

Figure 14:
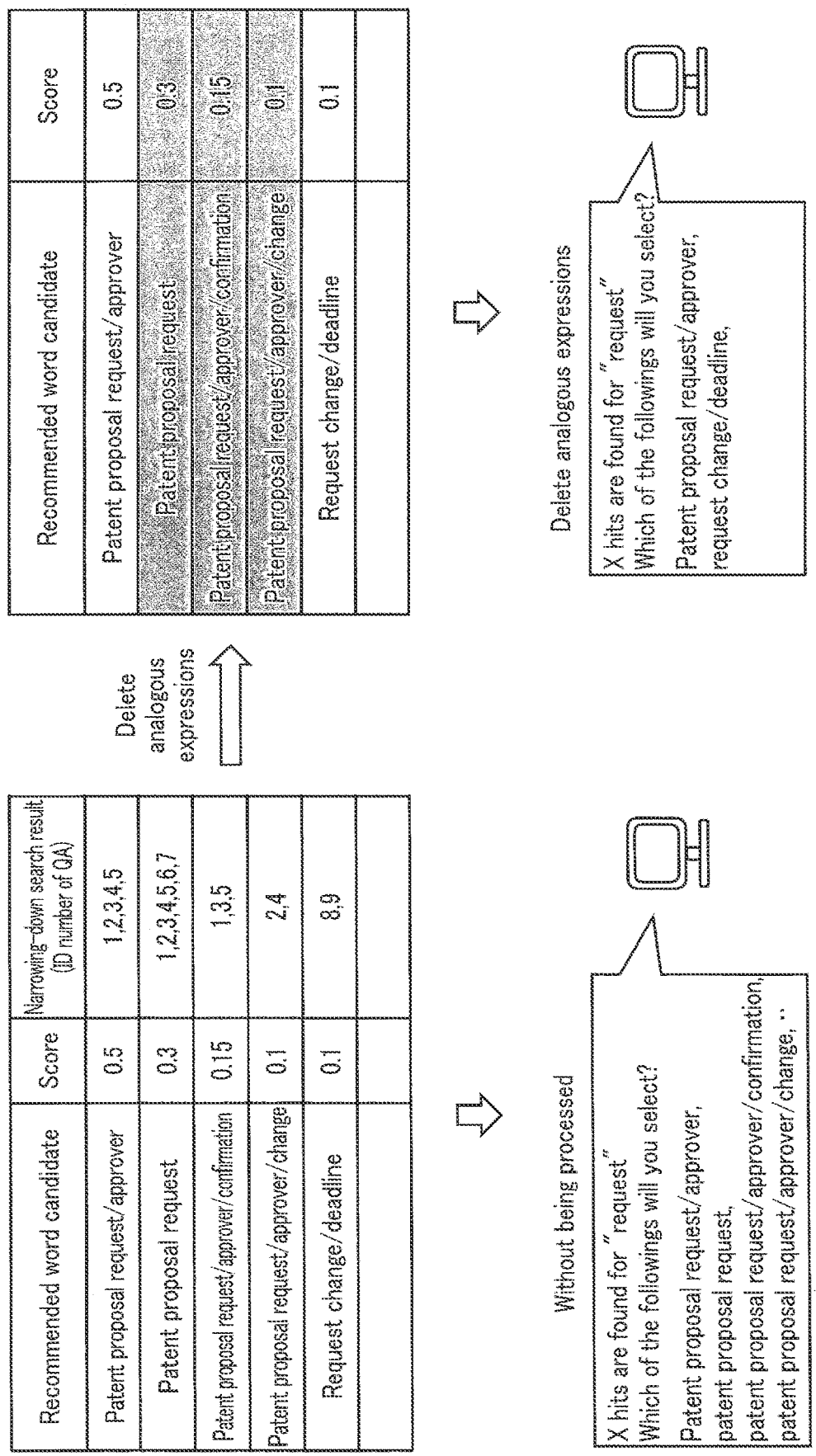
FIG. 14 is a diagram illustrating another operation example according to the third embodiment.

FIG. 14 is a diagram illustrating another operation example according to the third embodiment. In the case of FIG. 14, the recommended words having lower scores have a larger number of hits as the narrowing-down search results than the recommended words having higher scores. As illustrated in FIG. 14, the first-place recommended word candidate is "patent proposal request/approver", and the second-place recommended word candidate is "patent proposal request". Even if the recommended word having a lower score has a larger number of hits as the narrowing-down search results than the recommended word having a higher score, the determination unit 114 preferably leaves the recommended word candidate having a highest score and deletes the other recommended word candidates. In a case where "patent proposal request/approver" is left, the question-answer pairs with the ID numbers "6" and "7" obtained by narrowing down with "patent proposal request" cannot be included in the search results, but the other ID numbers "1" to "5" can be included in the search results. As a result, as illustrated in FIG. 14, "patent proposal request/approver" and "request change/deadline" are determined and displayed as recommended words.

FIG. 15 is a diagram illustrating another operation example according to the third embodiment. FIG. 15 illustrates an example of an inclusion relation among notation character strings of recommended word candidates, not an inclusion relation among word elements of a word string as illustrated in FIGS. 13 and 14. The notation of a recommended word candidate extracted as illustrated in FIG. 15 may be included in the notation of another word. This case is treated in a manner similar to the case of including word string elements. Since "patent proposal" and "proposal request" are included in the "patent proposal request" having a score in the first place, most of the narrowing-down search results obtained by the recommended word candidates having scores in the second and third ranks overlap. Therefore, "patent proposal" and "proposal request" can be regarded as being low in value. On the other hand, "proposal request approval" is not partially included in "patent proposal request", and thus the narrowing-down result of "proposal request approval" may be different from the narrowing-down result of "patent proposal request". Therefore, "proposal request approval" is determined to be valuable. As a result, "patent proposal request" and "proposal request approval" are determined and displayed as recommended words as illustrated in FIG. 15.

As described above, according to the third embodiment, it is possible to avoid presentation of the recommended word candidates in an analogous relation with each other as the recommended word. The words having substantially the same contribution to the narrowing are less likely to be displayed, so that a limited number of recommended words can be efficiently presented.

Fourth Embodiment

A determination unit 114 according to a fourth embodiment estimates a category of interest that is a category in which a user is interested from among a plurality of categories corresponding to a plurality of search result sentences, and determines a recommended word based on the category of interest, the inquiry sentence, the search result sentence, and the dependency relation. Hereinafter, the fourth embodiment will be described. In the following description, components having substantially the same functions as those of the first embodiment are denoted with the same reference numerals, and redundant description will be given only when necessary. In addition, description of parts in common with the first embodiment such as the process procedure of the interactive search and the display process of the recommended word will be omitted.

FIG. 16 is a diagram illustrating an example of a data structure of a collection of questions and answers stored in a sentence database 200 according to the fourth embodiment. As illustrated in FIG. 16, a collection of questions and answers according to the fourth embodiment is an accumulation of question-answer pairs that are a combination of a question sentence, an answer sentence to the question sentence, and a category of the question-answer pair. The category is attribute information given to classify the content of the question-answer pair. The category is information indicating the genre or question classification of the question-answer pair, and roughly classifies what kind of content the question-answer pair relates to. For example, the question-answer pair with the ID "2" is the question sentence "I want to change working hours", the answer sentence is "On the working hours management screen, . . . ", and the category is "work approval". The question sentence, the answer sentence, and the category are usually manually input, but may be automatically input by a computer.

Figure 17:
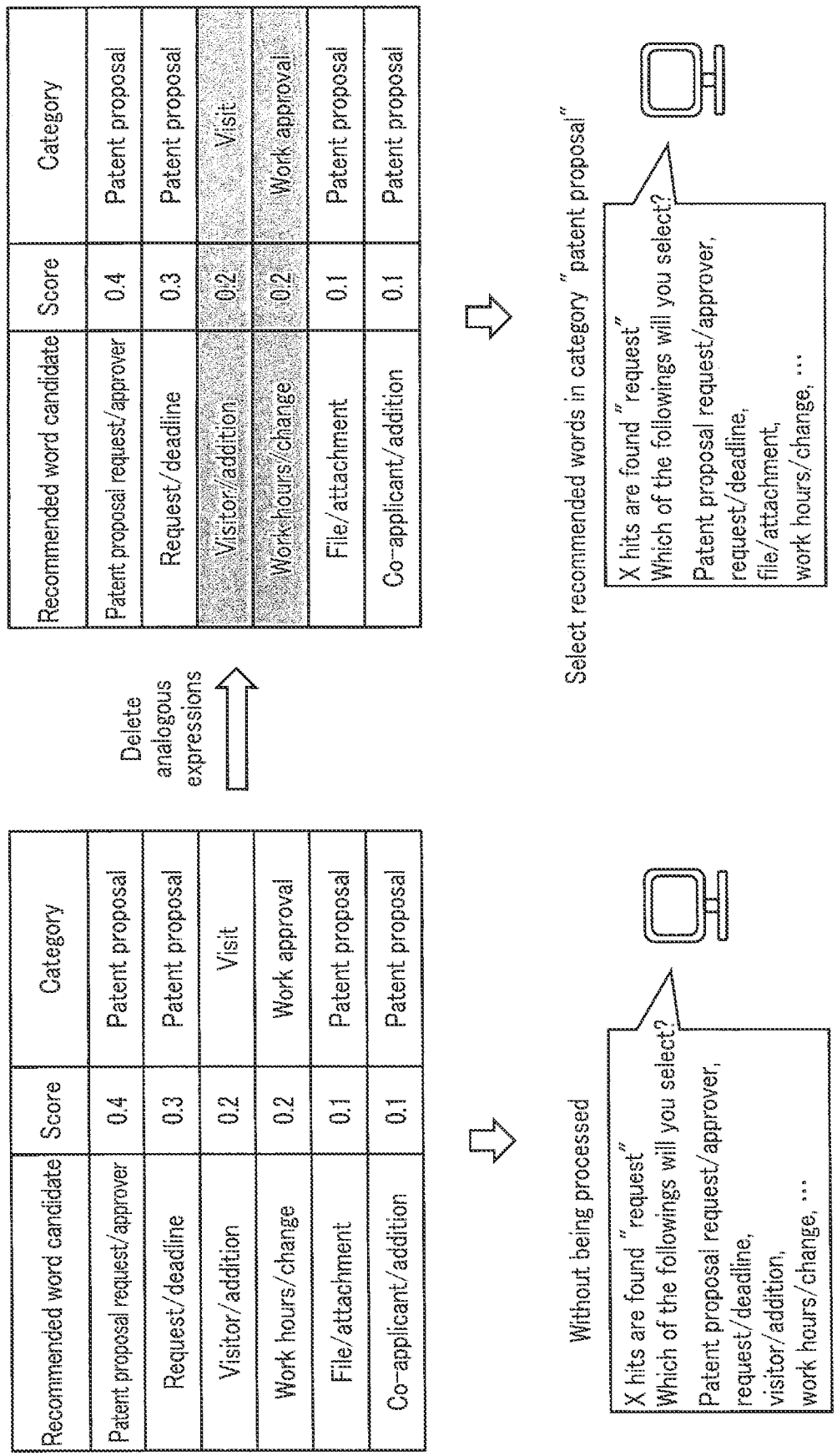
FIG. 17 is a diagram illustrating an operation example according to the fourth embodiment.

FIG. 17 is a diagram illustrating an operation example according to the fourth embodiment. As illustrated in the upper left table of FIG. 17, six recommended word candidates are specified and scores are calculated for the recommended word candidates. The determination unit 114 specifies the categories of question-answer pairs to which the recommended word candidates belong, based on the collection of questions and answers illustrated in FIG. 16. The determination unit 114 divides the categories into the categories of question-answer pairs to be displayed and the categories of question-answer pairs not to be displayed.

In the example of FIG. 17, the question-answer pairs are classified into three categories "patent proposal", "work approval", and "viewing". Usually, the user searches for a question-answer pair belonging to any one of categories in which the user's trouble is classified. Therefore, it is useless to display the recommended words in categories different from the category in which the user is interested. The category in which the user is interested is considered to be a category having a high proportion in the search result sentence. Therefore, if the recommended word candidates as in the example of FIG. 17 are obtained, first, the category of the question asked by the user is estimated. FIG. 17 illustrates an example of adopting "patent proposal" which is the category in which the most question-answer pairs have been searched for.

If no category is selected, "patent proposal request/approver", "request/deadline", "visitor/addition", and "working time/change" are displayed as recommended words as illustrated in FIG. 17. However, if the user is searching for a question-answer pair related to the patent proposal, "visitor/addition" and "working time/change" in different categories will never be selected. Therefore, the determination unit 114 estimates the category in which the user is interested (category of interest) from the categories of the question-answer pairs to which the recommended word candidates belong. Examples of the method of estimating the category of interest include a method of selecting a category to which the most question-answer pair of the search result sentence belongs, and a method of selecting a category to which most of the top candidates of the question-answer pair belong.

In the example of FIG. 17, among the six QA search results, four are in the category "patent proposal", one is in the category "work approval", and one is in the category "visit". From this result, it is considered that there is a high possibility that the user is searching for a question-answer pair related to the category "patent proposal". Therefore, the determination unit 114 estimates that "patent proposal", which is the category with the largest number of hits, is the category of interest. The determination unit 114 selects recommended word candidates associated with the interest category "patent proposal" as a recommended word. As a result, "patent proposal request/approver", "request/deadline", "file/attachment", and "co-applicant/addition" are selected and displayed as recommended words as illustrated in FIG. 17.

According to the fourth embodiment, even if question-answer pairs in a plurality of types of categories are mixed in the search result sentences, it is possible to estimate a category in which the user highly possibly makes an inquiry and to display recommended words related to the category. Displaying only recommended words in a narrowed category in which the user is highly possibly searching makes efficient the display of the recommended words.

Fifth Embodiment

A determination unit 114 according to a fifth embodiment determines the ranks of a plurality of search result sentences based on the degree of coincidence between words constituting each of the plurality of search result sentences and a word string constituting an inquiry sentence, and determines a recommended word based on the determined ranks, the inquiry sentence, the search result sentences, and dependency relations. More specifically, the determination unit 114 calculates the scores of the search result sentences based on the ranks of the search result sentences, and determines the recommended word based on the calculated scores in addition to the inquiry sentence, the search result sentences, and the dependency relations. This makes it possible to improve the efficiency of interactive search by selecting the recommended word preferentially from the words included in the higher-ranked search result sentence expected to have a high possibility of being a correct answer. Hereinafter, the fifth embodiment will be described. In the following description, components having substantially the same functions as those of the first embodiment are denoted with the same reference numerals, and redundant description will be given only when necessary. In addition, description of parts in common with the first embodiment such as the process procedure of the interactive search and the display process of the recommended word will be omitted.

FIG. 18 is a diagram illustrating an operation example according to the fifth embodiment. In the case of FIG. 18, the inquiry sentence is "I cannot make a request due to an error in approver", the search words are "approver", "error", and "request", and based on the search words, eight search result question sentences are acquired as follows: "The process cannot proceed due to an error in the selection of the approver at the time of patent proposal"; "An error occurs when the approver is changed"; "I want to add a plurality of approvers but cannot due to an error"; "An error in a proposal department code is displayed"; "An error occurs in an attached file of the patent proposal"; "An error is displayed when the submission button of the patent proposal is pressed"; "An error is displayed on the co-applicant addition screen"; and "An error indicating invalid date is displayed when the deadline of the patent proposal is specified".

If the search result sentences are acquired, the determination unit 114 determines the ranks of the search result question sentences regarding the degree of coincidence with the inquiry sentence. Various methods for determining the ranks can be used without particular limitation. For example, the determination unit 114 counts the numbers of search words included in the search result question sentences, and determines the ranks based on the numbers. The numbers attached to the left ends of the search result question sentences in FIG. 18 represent the ranks calculated by the determination unit 114.

Since there is no question-answer pair that matches the three search words, the question-answer pairs that match two of the search words are ranked in the first to third places, and the question-answer pairs that match one of the search words are ranked in the fourth and subsequent places. The recommended words generated from the search results are as illustrated in the right part of FIG. 18. The number of appearances of the recommended word candidate "error/display" is four, which is the largest number, and is ranked in the first place among the recommended word candidates. The policy of determining the ranks of the recommended word candidates by the number of appearances is adopted in many cases, but there is a problem in the example of FIG. 18. This is because the recommended word "error/display" related to the question-answer pair ranked in the fourth place or lower matching only one of the search words is prioritized over the recommended words related to the question-answer pairs ranked in the first to third places matching two of the search words.

If the user specifies a plurality of search words, a question-answer pair including many search words at the same time is often a question-answer pair that the user wants to search for. In order to realize such prioritization of the recommended words, a score weight table for the ranks of the question-answer pairs is prepared. The score weight table is a table in which the ranks of search result question sentences are associated with weight values. The weight value may be set to a larger value as the rank is higher. For example, the weight value "10" may be set for the rank "1", the weight value "8" may be set for the rank "2", the weight value "6" may be set for the rank "3", the weight value "4" may be set for the rank "4", the weight value "2" may be set for the rank "5", and the weight value "1" may be set for the rank "6". The score weight table is stored in the sentence database 200 or the storage device 12.

For each recommended word, the determination unit 114 specifies the ranks of the search result question sentences to which the recommended word belongs, specifies the weight values corresponding to the specified ranks from the score weight table, and calculates the scores based on the integrated value of rank and weight value. The ranks of the recommended words are as illustrated in the right part of FIG. 18. The question-answer pairs belonging to the recommended work candidate "error/display" of which the number of appearances is four are ranked in the fourth, sixth, seventh, and eighth places, and thus scores 2, 1, 1, and 1 points, respectively, and 5 points in total. On the other hand, the recommended word "approver/selection" included in the first-place question-answer pair scores 10 points, and the recommended word "approver/change" included in the second-place question-answer pair scores 8 points. As a result, if three recommended words are displayed, "approver/selection", "approver/change", and "approver/addition" are selected as recommended words and displayed, as illustrated in FIG. 18.

As described above, according to the fifth embodiment, the recommended word candidates included in the upper-rank search result sentences are likely to be selected as the recommended words. This makes it possible to display the recommended words related to the question-answer pair that the user is highly possibly searching for with priority, which make efficient the display of the recommended words.

Thus, it is possible to select recommended words useful for narrowing the search results in the interactive sentence search.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sentence search apparatus comprising:
a processing circuit,
wherein
the processing circuit is configured to:
    accept a character string input by a user;
    search a computerized sentence database storing a sentence collection in which a plurality of sentences as a search target is accumulated based on the accepted character string to acquire one or more search result sentences matching the accepted character string;
    perform sentence analysis on the search result sentence to acquire a dependency relation between words constituting the search result sentence; and
    determine one or more recommended words for narrowing down the search result sentence to a sentence desired by the user based on the accepted character string, the search result sentence, and the dependency relation,
the dependency relation is a modification relation, an object, or an adverbial modifier clause,
the processing circuit determines, as the recommended word, any one of a word in a modification relation with a word included in the accepted character string among the words constituting the search result sentence, a word serving as the object of a base word among the words constituting the search result sentence, and a word serving as an adverbial modifier clause of the base word among the words constituting the search result sentence,
the processing circuit is further configured to control a display to display an interactive screen including a message display field on a user side and a message display field on a side of a chatbot implemented by the sentence search apparatus,
messages on the user side and messages on the chatbot side are displayed in a time series in an interactive manner so as to be selectable, wherein the accepted input character string input by the user is displayed as a message in the message display field on the user side and the one or more search result sentences and the one or more recommended words are displayed as messages in the message display field on the chatbot side,
the processing circuit is further configured, in response to selection of a recommended word among the one or more recommended words in the message display field on the chatbot side, to display the selected recommended word in a next message display field on the user side, to narrow down the one or more search result sentences based on the selected recommended word, and to display, in a next message display field on chatbot side, one or more search result sentences remaining after narrowing down the one or more search result sentences in response to selection of the recommended word, and
the processing circuit is further configured, in response to selection of a search result sentence among the one or more sentence search results displayed on the chatbot side, to display a sentence corresponding to the selected search result sentence in a next message display field on the chatbot side.

2. The sentence search apparatus according to claim 1, wherein
each of the sentences includes a combination of a question sentence and an answer sentence to the question sentence, and
the processing circuit accepts an inquiry sentence in a question form as the character string, and acquires the question sentence and/or the answer sentence as the search result sentence.

3. The sentence search apparatus according to claim 1, wherein the processing circuit displays a relation between the recommended word and a word different from the recommended word among the words constituting the search result sentence.

4. The sentence search apparatus according to claim 1, wherein
the processing circuit is configured to:
determine one or more first recommended word candidates based on the accepted character string, the search result sentence, and the dependency relation;
determine one or more second recommended word candidates based on the accepted character string, the search result sentence, and an appearance degree of each word constituting the search result sentence; and
determine the recommended word based on the first recommended word candidate and the second recommended word candidate.

5. The sentence search apparatus according to claim 1, wherein the processing circuit deletes a recommended word similar to another recommended word from the recommended words.

6. The sentence search apparatus according to claim 1, wherein
the processing circuit is configured to:
estimate a category of interest that is a category in which the user is interested from among a plurality of categories corresponding to the search result sentences; and
determine the recommended word based on the category of interest, the accepted character string, the search result sentence, and the dependency relation.

7. The sentence search apparatus according to claim 1, wherein
the processing circuit is configured to:
determine ranks of the search result sentences based on a matching degree between a word constituting each of the search result sentences and a word string constituting the accepted character string; and
determine the recommended word based on the ranks, the accepted character string, the search result sentence, and the dependency relation.

8. The sentence search apparatus according to claim 1, wherein the processing circuit uses at least one of dependency parsing, syntax analysis, and graph-based ranking as the sentence analysis.

9. A sentence search method executed by a processing circuit, the method comprising:
accepting a character string input by a user;
searching a computerized sentence database storing a sentence collection in which a plurality of sentences as a search target is accumulated based on the accepted character string to acquire one or more search result sentences matching the accepted character string;
performing sentence analysis on the search result sentence to acquire a dependency relation between words constituting the search result sentence; and
determining one or more recommended words for narrowing down the search result sentence to a sentence desired by the user based on the accepted character string, the search result sentence, and the dependency relation,
wherein
the dependency relation is a modification relation, an object, or an adverbial modifier clause,
determining the one or more recommended words comprises determining, as the recommended word, any one of a word in a modification relation with a word included in the accepted character string among the words constituting the search result sentence, a word serving as the object of a base word among the words constituting the search result sentence, and a word serving as an adverbial modifier clause of the base word among the words constituting the search result sentence,
the method further comprises controlling a display to display an interactive screen including a message display field on a user side and a message display field on a side of a chatbot implemented by the processing circuit,
messages on the user side and messages on the chatbot side are displayed in a time series in an interactive manner so as to be selectable, wherein the accepted input character string input by the user is displayed as a message in the message display field on the user side and the one or more search result sentences and the one or more recommended words are displayed as messages in the message display field on the chatbot side, and
the method further comprises:
in response to selection of a recommended word among the one or more recommended words in the message display field on the chatbot side, displaying the selected recommended word in a next message display field on the user side, narrowing down the one or more search result sentences based on the selected recommended word, and displaying, in a next message display field on chatbot side, one or more search result sentences remaining after narrowing down the one or more search result sentences in response to selection of the recommended word, and
in response to selection of a search result sentence among the one or more sentence search results displayed on the chatbot side, displaying a sentence corresponding to the selected search result sentence in a next message display field on the chatbot side.

10. A non-transitory computer readable storage medium including computer executable instructions, wherein the instructions, when executed by a processor, cause the processor to perform operations comprising:
accepting a character string input by a user;
searching a computerized sentence database storing a sentence collection in which a plurality of sentences as a search target is accumulated based on the accepted character string to acquire one or more search result sentences matching the accepted character string;
performing sentence analysis on the search result sentence to acquire a dependency relation between words constituting the search result sentence; and
determining one or more recommended words for narrowing down the search result sentence to a sentence desired by the user based on the accepted character string, the search result sentence, and the dependency relation, wherein the dependency relation is a modification relation, an object, or an adverbial modifier clause, determining the one or more recommended words comprises determining, as the recommended word, any one of a word in a modification relation with a word included in the accepted character string among the words constituting the search result sentence, a word serving as the object of a base word among the words constituting the search result sentence, and a word serving as an adverbial modifier clause of the base word among the words constituting the search result sentence, the instructions cause the processor to perform further operations comprising controlling a display to display an interactive screen including a message display field on a user side and a message display field on a side of a chatbot implemented by the processor, messages on the user side and messages on the chatbot side are displayed in a time series in an interactive manner so as to be selectable, wherein the accepted input character string input by the user is displayed as a message in the message display field on the user side and the one or more search result sentences and the one or more recommended words are displayed as messages in the message display field on the chatbot side, and the instructions cause the processor to perform further operations comprising:

in response to selection of a recommended word among the one or more recommended words in the message display field on the chatbot side, displaying the selected recommended word in a next message display field on the user side, narrowing down the one or more search result sentences based on the selected recommended word, and displaying, in a next message display field on chatbot side, one or more search result sentences remaining after narrowing down the one or more search result sentences in response to selection of the recommended word, and in response to selection of a search result sentence among the one or more sentence search results displayed on the chatbot side, displaying a sentence corresponding to the selected search result sentence in a next message display field on the chatbot side.

* * * * *